United States Patent
Hikosaka et al.

(10) Patent No.: US 9,413,993 B2
(45) Date of Patent: Aug. 9, 2016

(54) SOLID-STATE IMAGING DEVICE FOR REDUCING NOISE, AND IMAGING DEVICE FOR REDUCING NOISE HAVING A MULTI-STAGE SAMPLE AND HOLD CIRCUIT STABILIZING VOLTAGE SUPPLIED TO LOAD TRANSISTORS

(71) Applicant: Panasonic Corporation, Osaka (JP)

(72) Inventors: Koji Hikosaka, Osaka (JP); Makoto Ikuma, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 139 days.

(21) Appl. No.: 14/290,159

(22) Filed: May 29, 2014

(65) Prior Publication Data

US 2014/0263966 A1    Sep. 18, 2014

Related U.S. Application Data

(63) Continuation of application No. PCT/JP2012/007332, filed on Nov. 15, 2012.

(30) Foreign Application Priority Data

Dec. 14, 2011    (JP) .................................. 2011-273154

(51) Int. Cl.
*H04N 5/357*    (2011.01)
*H04N 5/3745*    (2011.01)
(Continued)

(52) U.S. Cl.
CPC ............. *H04N 5/357* (2013.01); *H04N 5/3577* (2013.01); *H04N 5/378* (2013.01); *H04N 5/3745* (2013.01); *H04N 5/3658* (2013.01); *H04N 5/3698* (2013.01); *H04N 5/37457* (2013.01)

(58) Field of Classification Search
CPC .... H04N 5/357; H04N 5/3658; H04N 5/3577
USPC ................... 250/208.1, 214 R; 348/294–311; 257/290–292, 440–444
See application file for complete search history.

(56) References Cited

U.S. PATENT DOCUMENTS 7,889,247 B2    2/2011    Oike
8,063,966 B2    11/2011   Shinohara
(Continued)

FOREIGN PATENT DOCUMENTS

JP    2007-116565    5/2007
JP    2009-171210    7/2009
(Continued)

OTHER PUBLICATIONS

International Search Report issued in International Application No. PCT/JP2012/007332 on Jan. 22, 2013.

*Primary Examiner* — Que T Le
(74) *Attorney, Agent, or Firm* — Wenderoth, Lind & Ponack, L.L.P.

(57) ABSTRACT

A solid-state imaging device according to the present invention includes: a pixel block in which pixels are arranged in a matrix; vertical common signal lines each provided for a corresponding one of columns of the plurality of pixels, and reads signals of pixels in the corresponding column; and a column constant current source which supplies a current to the vertical common signal lines, wherein the column constant current source includes: load transistors each having a source terminal and a drain terminal one of which is connected to one of the vertical common signal lines and the other of which is grounded; a constant voltage supply unit which supplies a voltage to gate terminals of the load transistors; and a voltage holding circuit in which sample and hold circuits are connected in multiple stages, and which stabilizes the voltage which is supplied to the gate terminals of the load transistors.

15 Claims, 18 Drawing Sheets

(51) Int. Cl.
*H04N 5/378* (2011.01)
*H04N 5/365* (2011.01)
*H04N 5/369* (2011.01)

(56) References Cited

U.S. PATENT DOCUMENTS

| | | | |
|---|---|---|---|
| 8,072,528 B2 * | 12/2011 | Nomoto | H04N 3/155 348/294 |
| 8,269,873 B2 | 9/2012 | Koseki et al. | |
| 8,471,942 B2 | 6/2013 | Shinohara | |
| 2007/0091191 A1 | 4/2007 | Oike | |
| 2009/0090844 A1 | 4/2009 | Yan et al. | |
| 2009/0231478 A1 | 9/2009 | Shinohara | |
| 2009/0295968 A1 | 12/2009 | Matsuda et al. | |
| 2010/0264298 A1 | 10/2010 | Ryoki et al. | |
| 2011/0115958 A1 | 5/2011 | Koseki et al. | |
| 2011/0115959 A1 | 5/2011 | Toyama et al. | |
| 2012/0092540 A1 | 4/2012 | Shinohara | |
| 2013/0201372 A1 | 8/2013 | Ryoki et al. | |

FOREIGN PATENT DOCUMENTS

| | | |
|---|---|---|
| JP | 2009-225004 | 10/2009 |
| JP | 2009-290628 | 12/2009 |
| JP | 2010-268440 | 11/2010 |
| JP | 2011-109282 | 6/2011 |
| JP | 2011-109486 | 6/2011 |
| JP | 2012-199731 | 10/2012 |

* cited by examiner

SOLID-STATE IMAGING DEVICE FOR REDUCING NOISE, AND IMAGING DEVICE FOR REDUCING NOISE HAVING A MULTI-STAGE SAMPLE AND HOLD CIRCUIT STABILIZING VOLTAGE SUPPLIED TO LOAD TRANSISTORS

CROSS REFERENCE TO RELATED APPLICATIONS

This is a continuation application of PCT International Application No. PCT/JP2012/007332 filed on Nov. 15, 2012, designating the United States of America, which is based on and claims priority of Japanese Patent Application No. 2011-273154 filed on Dec. 14, 2011. The entire disclosures of the above-identified applications, including the specifications, drawings and claims are incorporated herein by reference in their entirety.

FIELD

The present disclosure relates to a solid-state imaging device and an imaging device and particularly to a technique for reducing noise.

BACKGROUND

In recent years, metal oxide semiconductors (MOSs) have been focused as image information obtaining means for use in mobile phones, digital still cameras, movie cameras, etc. This is because MOS solid-state imaging devices have many advantages of (i) being manufactured in processes for complementary metal oxide semiconductors (CMOSs), using existing equipment with a low cost, (ii) allowing high-speed reading for high-speed processing while achieving higher resolutions, and (iii) being operable with a low voltage and power.

A technique as in Patent Literature 1 has been conceived in order to maintain, at a certain level, a load current which is supplied to an amplifier transistor in a pixel circuit in a MOS solid-state imaging device.

FIG. 22 is a circuit block diagram of a solid-state imaging device disclosed in Patent Literature 1. In the diagram, the load current supply circuit 610 disposed for each pixel column supplies a load current to the amplifier transistor in the pixel circuit through a vertical signal line VSL. In the load current supply circuit 610, a setting transistor 611 sets a constant holding voltage to the holding capacitor 613, based on a maintenance control signal from a maintenance control signal line. In addition, the load transistor 614 has a constant gate voltage due to a constant holding voltage held in the holding capacitor 613, and thus supplies a constant load current to the vertical signal line. With the circuit structure, it is possible to maintain, at a certain level, a load current to be supplied to the amplifier transistor in the pixel circuit.

CITATION LIST

Patent Literature

[PTL 1]
Japanese Laid-open Patent Application Publication No. 2011-109486

SUMMARY

Technical Problem

However, in recent years in which further refinement and circuit area reduction have been desired for solid state imaging devices, it is difficult to reduce noise sufficiently using the aforementioned conventional technique disclosed in Patent Literature (PTL) 1.

In the conventional technique in PTL 1, in a period in which the setting transistor 611 is a non-conductive (OFF) state, the setting transistor 611 normally has parasitic capacitance Cp at both ends. For this reason, high frequency noise of a reference current line 601 is transferred to the gate of the load transistor 614 through the parasitic capacitance Cp. This high frequency noise can be reduced by setting a larger holding capacitor 613, but the holding capacitor 613 needs to be made smaller for further refinement and circuit area reduction. For this reason, high frequency noise cannot be reduced sufficiently, which makes it difficult to maintain, at a certain level, a current to be supplied to the amplifier transistor of the pixel circuit.

In order to solve the problem, the present invention has an object to provide a solid-state imaging device and an imaging device both capable of maintaining a constant current which is supped to amplifier transistors of pixel circuits while achieving refinement and circuit area reduction.

Solution to Problem

In order to solve the above-described problem, the solid-state imaging device according to the present invention is a solid-state imaging device including: a pixel unit in which a plurality of pixels are arranged in a matrix; a plurality of vertical common signal lines each of which is provided for a corresponding one of columns of the plurality of pixels, and reads signals of pixels in the corresponding column; and a column constant current source which supplies a current to the plurality of vertical common signal lines, wherein the column constant current source includes: a plurality of load transistors each having a source terminal and a drain terminal one of which is connected to one of the plurality of vertical common signal lines and the other of which is grounded; a constant voltage supply unit which supplies a voltage to gate terminals of the plurality of load transistors; and a first multi-stage sample and hold circuit in which sample and hold circuits for sampling and holding the voltage are connected in multiple stages, the first multi-stage sample and hold circuit stabilizing the voltage which is supplied to the gate terminals of the plurality of load transistors.

In addition, a gate terminal of at least one of the load transistors and the constant voltage supply unit may be connected to each other via the first multi-stage sample and hold circuit.

In addition, the first multi-stage sample and hold circuit may include a first sample and hold circuit and a second sample and hold circuit, the first sample and hold circuit may include: a first holding capacitor having an electrode connected to a reference potential supply circuit and an other electrode connected to the gate terminal of the load transistor; and a first switch element having a terminal connected to the gate terminal of the load transistor, and the second sample and hold circuit may include: a second holding capacitor having an electrode connected to the reference potential supply circuit and an other electrode connected to an other terminal of the first switch element; and a second switch element having a terminal connected to the other terminal of the first switch element and an other terminal connected to the constant voltage supply unit.

In addition, the first holding capacitor may have a capacitance value larger than a capacitance value of the second holding capacitor.

In addition, when the first multi-stage sample and hold circuit starts holding the voltage, the first switch element may be switched to an OFF state and then the second switch element may be changed into an OFF state.

In addition, the column constant current source may further include: a column constant current source transistor connected in series to the load transistor; and a second multi-stage sample and hold circuit in which sample and hold circuits for sampling and holding the voltage may be connected in multiple stages, the second multi-stage sample and hold circuit being connected to the gate terminal of the column constant current source transistor.

In addition, the first multi-stage sample and hold circuit may include a first sample and hold circuit and a second sample and hold circuit, the first sample and hold circuit may include: a first holding capacitor having an electrode connected to a reference potential supply circuit and an other electrode connected to the gate terminal of the load transistor; and a first switch element having a terminal connected to the gate terminal of the load transistor, and the second sample and hold circuit may include: a second holding capacitor having an electrode connected to the reference potential supply circuit and an other electrode connected to an other terminal of the first switch element; second switch element having a terminal connected to the other terminal of the first switch element and an other terminal connected to the constant voltage supply unit, and the second sample and hold circuit may include: a third sample and hold circuit; and a fourth sample and hold circuit, the third sample and hold circuit may include: a third holding capacitor having an electrode connected to the reference potential supply circuit and an other electrode connected to a gate terminal of the column constant current source transistor; and a third switch element having a terminal connected to the gate terminal of the column constant current source transistor, and the fourth sample and hold circuit may include: a fourth holding capacitor having an electrode connected to the reference potential supply circuit and an other electrode connected to an other terminal of the third switch element; and a fourth switch element having a terminal connected to the other terminal of the third switch element.

In addition, the first holding capacitor may have a capacitance value larger than a capacitance value of the second holding capacitor, and the third holding capacitor may have a capacitance value larger than a capacitance value of the fourth holding capacitor.

In addition, the solid-state imaging device may further include a reference voltage source which supplies a voltage to the gate terminal of a current source transistor included in the constant voltage supply unit, wherein the gate terminal of the current source transistor and the reference voltage source may be connected to each other via the first multi-stage sample and hold circuit.

In addition, the first multi-stage sample and hold circuit may include a first sample and hold circuit and a second sample and hold circuit, the first sample and hold circuit may include: a first holding capacitor having an electrode connected to a reference potential supply circuit and an other electrode connected to the gate terminal of the load transistor; and a first switch element having a terminal connected to the gate terminal of the load transistor, and the second sample and hold circuit may include: a second holding capacitor having an electrode connected to the reference potential supply circuit and an other electrode connected to an other terminal of the first switch element; and a second switch element having a terminal connected to the other terminal of the first switch element and an other terminal connected to the constant voltage supply unit.

In addition, the column constant current source may further include: a column constant current source transistor connected in series to the load transistor; and a second multi-stage sample and hold circuit in which sample and hold circuits for sampling and holding the voltage are connected in multiple stages, the second multi-stage sample and hold circuit being connected to the gate terminal of the column constant current source transistor.

In addition, the first multi-stage sample and hold circuit may include a first sample and hold circuit and a second sample and hold circuit, the first sample and hold circuit may include: a first holding capacitor having an electrode connected to a reference potential supply circuit and an other electrode connected to the gate terminal of the load transistor; and a first switch element having a terminal connected to the gate terminal of the load transistor, and the second sample and hold circuit may include: a second holding capacitor having an electrode connected to the reference potential supply circuit and an other electrode connected to an other terminal of the first switch element; a second switch element having a terminal connected to the other terminal of the first switch element and an other terminal connected to the constant voltage supply unit, and the second sample and hold circuit may include: a third sample and hold circuit; and a fourth sample and hold circuit, the third sample and hold circuit may include: a third holding capacitor having an electrode connected to the reference potential supply circuit and an other electrode connected to a gate terminal of the column constant current source transistor; and a third switch element having a terminal connected to the gate terminal of the column constant current source transistor, and the fourth sample and hold circuit may include: a fourth holding capacitor having an electrode connected to the reference potential supply circuit and an other electrode connected to an other terminal of the third switch element; and a fourth switch element having a terminal connected to the other terminal of the third switch element.

Furthermore, the present invention can not only be realized as the solid-state imaging device having the above-described features, but also as an imaging device mounting the solid-state imaging device and providing the same advantageous effects.

Advantageous Effects

The solid-state imaging device according to the present invention can stabilize a voltage to the gate terminal of a load transistor which supplies a constant current to the amplifier transistor of each pixel while suppressing increase in the circuit area. Thus, it is possible to reduce noise in and the circuit area of the solid-state imaging device.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Hereinafter, embodiments are described in detail with reference to the drawings.

It is to be noted that each of the embodiments described below shows a generic or specific example. The numerical values, shapes, structural elements, the arrangement and connection of the structural elements, etc. shown in the following exemplary embodiments are mere examples, and therefore do not limit the present invention. Among the structural elements in the following embodiments, structural elements which are not recited in any one of the independent claims and show the most generic concept are described as arbitrary structural elements.

Embodiment 1

Hereinafter, a structure of a solid-state imaging device according to an embodiment and operations performed thereby are described with reference to the drawings.

The solid-state imaging device according to this embodiment includes a load transistor for supplying a current to amplifier transistors for pixels in each of columns, and having a gate terminal with a voltage holding means for stabilizing a voltage of the gate terminal of the load transistor. The voltage holding means has a structure in which so-called sample and hold circuits (S/H circuits) each including a switch element and a holding capacitor are connected to each other in two stages. With this structure, it is possible to reduce noise in and the circuit area of the solid-state imaging device.

Figure 1:
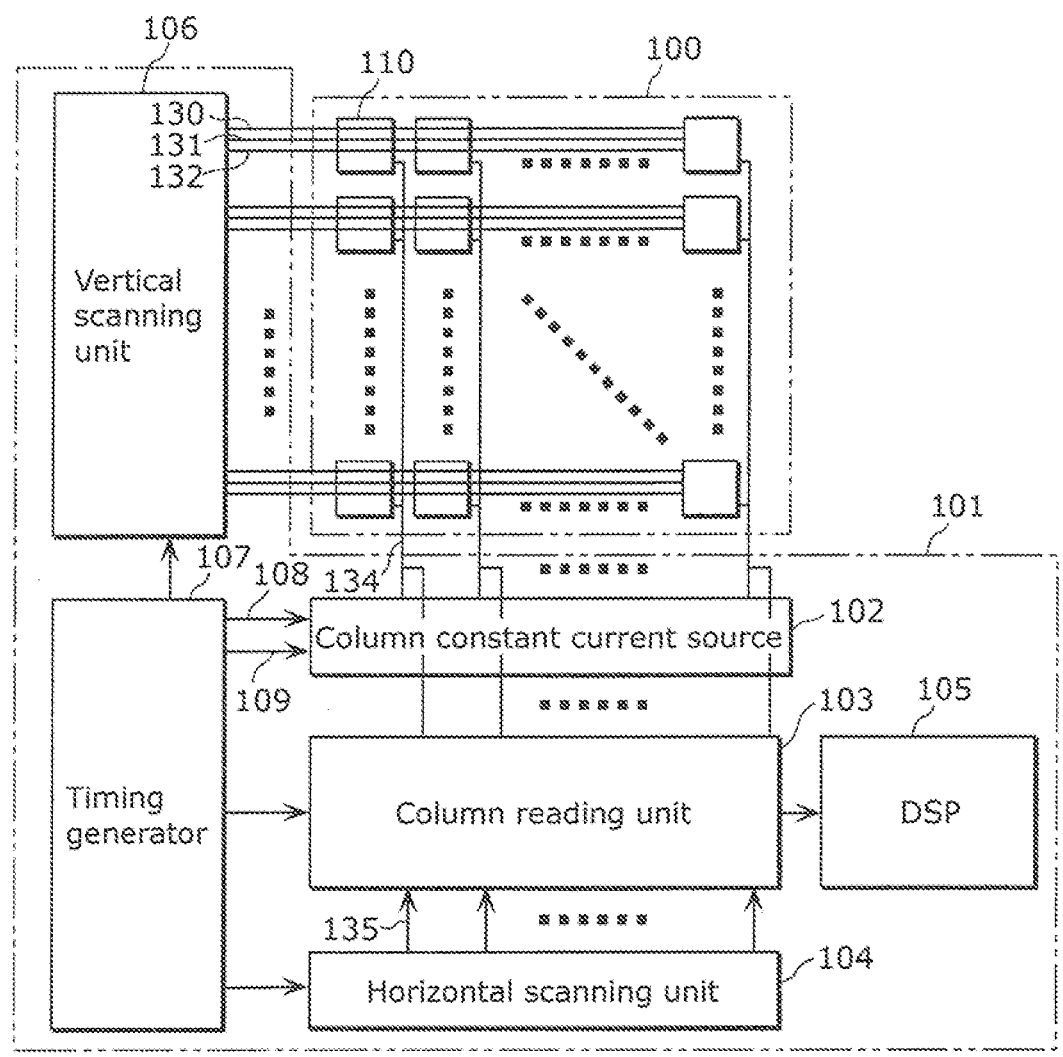
FIG. 1 is a functional block diagram of a solid-state imaging device according to Embodiment 1.

FIG. 1 is a functional block diagram of the solid-state imaging device according to Embodiment 1. As shown in the diagram, the solid-state imaging device according to this embodiment includes: a pixel block 100 which is a pixel unit in which pixels 110 are arranged in a matrix; and a peripheral circuit block 101 in which a peripheral circuit for driving the pixel block 100 is formed.

The peripheral circuit block 101 includes: a column constant current source 102; a column reading unit 103; a horizontal scanning unit 104; a digital signal processor (DSP) 105; a vertical scanning unit 106; and a timing generator 107. In FIG. 1, the peripheral circuit block 101 is disposed only one side of the pixel block 100, but may be disposed in any way.

Figure 2:
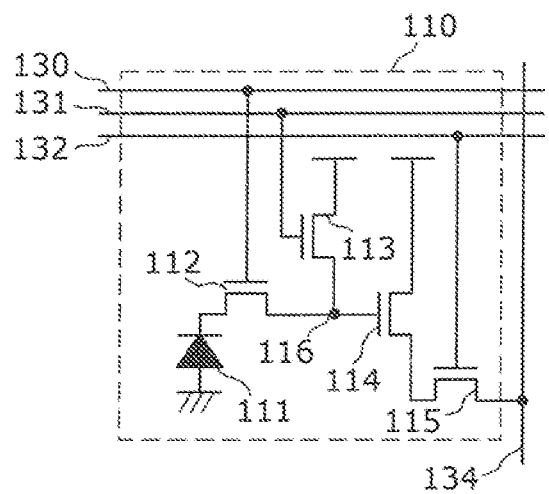
FIG. 2 is a circuit diagram showing a first example of pixels according to Embodiment 1.

FIG. 2 is a circuit diagram showing a first example of pixels according to Embodiment 1. As shown in the diagram, the pixel 110 includes a photodiode 111, a transfer transistor 112, a reset transistor 113, an amplifier transistor 114, and a row selection transistor 115, and thus is a pixel having four transistors and one pixel per cell.

Figure 3:
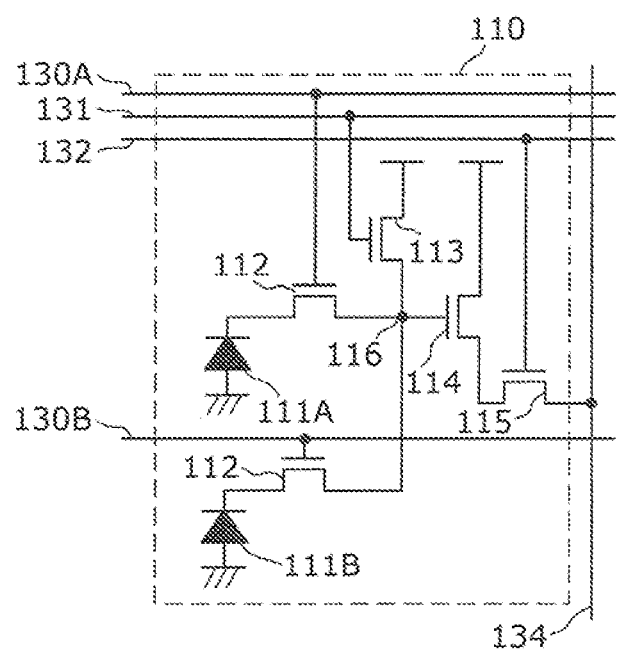
FIG. 3 is a circuit diagram showing a second example of pixels according to Embodiment 1.

Here, in FIG. 2, the pixel of one-pixel per cell type is shown. However, the pixel may have any other structure which allows output of a signal voltage from the photodiode to a vertical common signal line 134. For example, the pixel may be a pixel of n-pixels per cell type in which a plurality of photodiodes are provided for a single amplifier transistor. FIG. 3 shows a pixel of a two-pixels per cell type.

FIG. 3 is a circuit diagram showing a second example of pixels according to Embodiment 1. More specifically, the circuit has a structure of a two-pixels per cell type in which two photodiodes 111A and 111B are connected to the single amplifier transistor 114. Here, the value for n can be selected arbitrarily. In addition, instead of the pixel of a four-transistor type, the pixel of a three-transistor type without a row selection transistor may be used. Each of the transistors that constitute the pixel may be either an NMOS transistor or a PMOS transistor. In addition, a plurality of vertical common signal lines may be provided for each row.

In each pixel 110, the amplifier transistor 114 is connected to the vertical common signal line 134 provided for the row through the row selection transistor 115. The column constant current source 102 which supplies a current to the amplifier transistor 114 in the row through the vertical common signal line 134, and the amplifier transistor 114 in the row in which the row selection transistor 115 is conductive constitute a source follower circuit (hereinafter, referred to as a pixel source follower). Each of the transfer transistor 112, the reset transistor 113, and the row selection transistor 115 receives supply of a timing signal from the vertical scanning unit 106 from a transfer control line 130, a reset control line 131, or a row selection control line 132.

Based on a signal from a timing generator 107, the vertical scanning unit 106 performs vertical scanning for sequentially selecting, for each row, pixels 110 by sequentially activating the transfer control line 130, the reset control line 131, and the row selection control unit 132. Signal voltages of the pixels 110 belonging to the selected row are transferred to the column reading unit 103 through the pixel source follower for the column.

Figure 4:
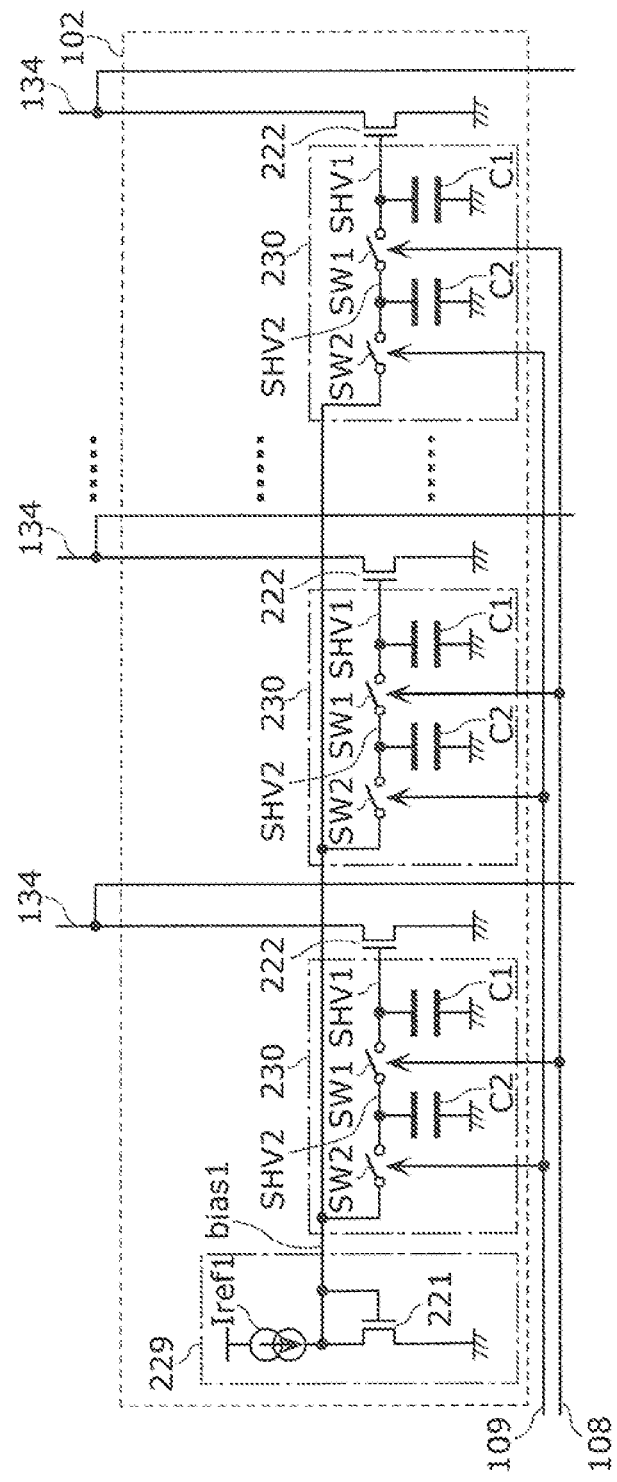
FIG. 4 is a circuit diagram showing an example of a column constant current source according to Embodiment 1.

FIG. 4 is a circuit diagram showing an example of a column constant current source according to Embodiment 1. In the case of the four-transistor-type pixels arranged in the same row through the row selection transistor 115, the amplifier transistors 114 in the pixels 110 are connected to the vertical common signal line 134. The vertical common signal line 134 is provided for each row of a plurality of pixels 110, and has a function for reading signals of pixels in the corresponding column.

As shown in FIG. 4, the vertical common signal line 134 is connected to one of a source terminal and a drain terminal of the load transistor 222. The other terminal of the load transistor 222 is grounded. Here, grounding means connecting to a ground voltage (hereinafter referred to as a GND voltage) supply circuit.

Furthermore, the vertical common signal line 134 is also connected to a column reading unit 103 in a later stage.

The gate terminal of each load transistor 222 in each row is connected to a bias voltage line bias1 through a voltage holding circuit 230 provided for the row. In addition, the bias voltage line bias1 is connected to a constant voltage supply unit 229.

The constant voltage supply unit 229 is a bias circuit which supplies a constant voltage to the gate terminal of the load transistor 222, and includes a transistor 221 for driving the load transistor and a reference current source Iref1.

The voltage holding circuit 230 is a first multi-stage sample and hold circuit: which includes switch elements SW1 and SW2 and holding capacitors C1 and C2; in which sample and hold circuits for sampling and holding a voltage are connected in multiple stages; and which stabilizes a voltage to be supplied to the gate terminal of the plurality of load transistors 222. The holding capacitor C1 has an electrode which is connected to one of the terminals of the switch element SW1 and the gate terminal of the load transistor 222 through a voltage holding line SHV1, and an electrode which is grounded. The holding capacitor C2 has an electrode which is connected to the other terminal of the switch element SW1 and one of the terminals of the switch element SW2, and an electrode which is grounded. The other terminal of the switch element SW2 is connected to the bias voltage line bias1. The switch elements SW1 and SW2 are switched between a conductive (ON) state and a non-conductive (OFF) state by the timing generator 107 respectively through the switch element control lines 108 and 109.

For example, when a connection voltage is supplied from the timing generator 107 to both the switch elements SW1 and SW2, both the switch elements SW1 and SW2 are switched ON to equalize the potentials of the bias voltage line bias1 and the voltage holding lines SHV1 and SHV2.

For example, when the timing generator 107 supplies the connection voltage to the switch element SW1 and a non-connection voltage to the switch element SW2, the switch element SW1 is switched ON to equalize the potentials of the voltage holding lines SHV1 and SHV2. On the other hand, the switch element SW2 is switched OFF to insulate between the bias voltage line bias1 and the voltage holding line SHV2.

For example, when the timing generator 107 supplies a non-connection voltage to the switch element SW1 and a connection voltage to the switch element SW2, the switch element SW1 is switched OFF to insulate between the voltage holding lines SHV1 and SHV2. On the other hand, the switch element SW2 is switched ON to equalize the potentials of the bias voltage line bias1 and the voltage holding line SHV2.

For example, when the timing generator 107 supplies a non-connection voltage to both the switch elements SW1 and SW2, the switch elements SW1 and SW2 are switched OFF to insulate between the bias voltage line bias1 and the voltage holding lines SHV1 and SHV2.

As described above, the switch elements SW1 and SW2 stabilize the voltages of the gate terminal of the load transistor 222, based on the control signals from the timing generator 107. In other words, the switch elements SW1 and SW2 hold constant voltages in the holding capacitors C1 and C2, based on the control signals. In other words, the switch element SW1 and the holding capacitor C1 constitute a first sample and hold circuit (hereinafter referred to as an S/H circuit). In addition, the switch element SW2 and the holding capacitor C2 constitute a second sample and hold circuit.

By configuring the voltage holding circuit 230 with two-stage S/H circuit, it is possible to block noise of the bias voltage line bias1 although such noise cannot be blocked using a one-stage S/H circuit, and to hold a constant voltage of the gate terminal of the load transistor 222, reducing noise. Furthermore, by configuring the voltage holding circuit 230 with the two-stage S/H circuit, it is possible to reduce the area of the holding capacitor of the voltage holding circuit 230 compared to conventional circuits. For example, the following Expression 1 shows a transfer function from the bias voltage line bias1 to the voltage holding line SHV1 in a conventional circuit including a one-stage S/H circuit (here, without a holding capacitor C2 and a switch element SW2). In the Expression 1, Cp denotes parasitic capacitances at both ends of the switch elements SW1 and SW2 during a period in which the switch elements SW1 and SW2 are in an OFF state.

[Math. 1]

$$SHV1 = \frac{Cp}{C1} \cdot bias1 \qquad \text{(Expression 1)}$$

The following Expression 2 shows a transfer function in the present invention.

[Math. 2]

$$SHV1 = \frac{Cp}{C1} \cdot \frac{Cp}{C2} bias1 \qquad \text{(Expression 2)}$$

First, when a holding capacitor C1 is 100 Cp in a conventional structure, noise in the bias voltage line bias1 is reduced to 1/100. At this time, the holding capacitor area of the voltage holding circuit 230 is assumed to be 100. In this embodiment, holding capacitors C1 and C2 to obtain the same effect as in the conventional one achieve C1=C2=10 Cp. In other words, the holding capacitor area of the voltage holding circuit 230 is 20, achieving a reduction in the area of the holding capacitor to 1/5 compared to the conventional structure.

Here, any of the capacitance values of the holding capacitors C1 and C2 may be larger than the other, C1>C2 is preferable. The reason is that, in a hold period, charge stored in the holding capacitor C1 decreases gradually due to, for example, leakage from the gate of the transistor, which changes a voltage between the holding capacitor C1, that is, a voltage of the gate terminal of the load transistor 222. As a result, a current to be supplied to the amplifier transistor 114 changes, generating noise. For this reason, in the limited area, there is a need to increase the capacitance of the holding capacitor C1 as much as possible, and to reduce the amount of change in the voltage of the gate terminal of the load transistor 222 against such leakage. On the other hand, areas for the holding capacitors C1 and C2 are limited, and thus it is difficult to increase both of the capacitances of the holding capacitors C1 and C2. Thus, the capacitance of the holding capacitor C2 is only necessary to be reduced to an extent that does not affect the effect of noise reduction. By increasing the capacitance of the holding capacitor C1 by the amount of reduction in the capacitance of the holding capacitor C2, it is possible to provide the effect of reducing the amount of change in the voltage of the gate terminal of the load transistor 222 against the leakage of charge stored in the holding capacitor C1.

Figure 5:
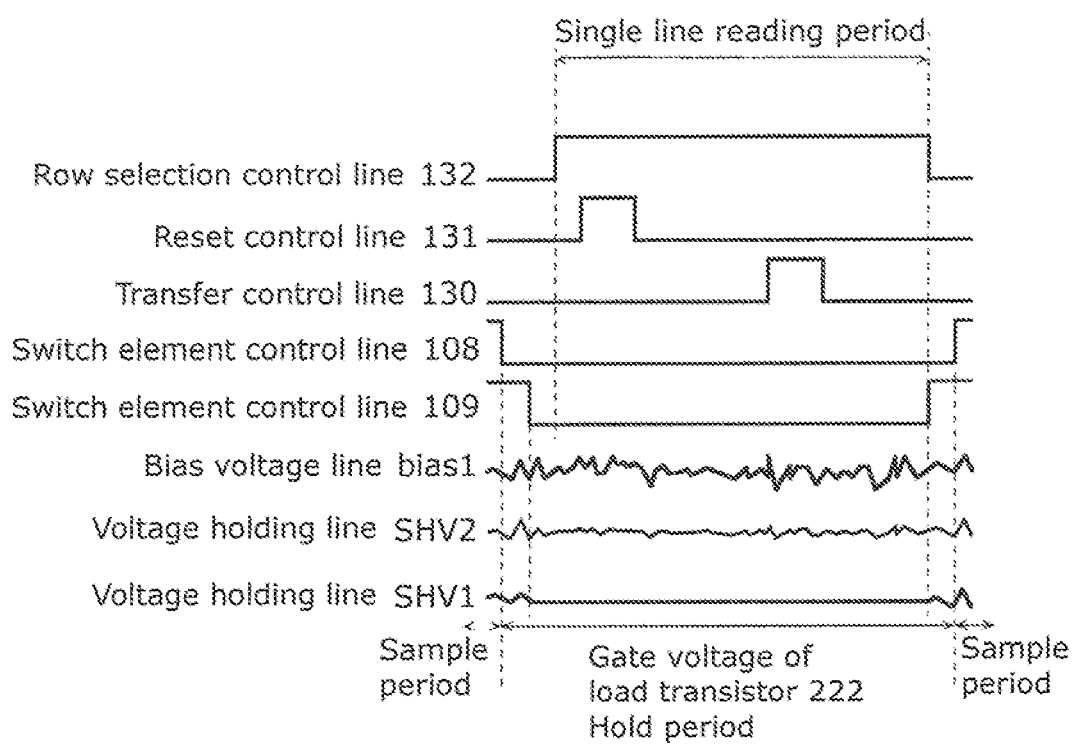
FIG. 5 is a timing chart showing a first driving example of the solid-state imaging device according to Embodiment 1.

FIG. 5 is a timing chart showing a first driving example of the solid-state imaging device according to Embodiment 1. The chart shows a specific example of vertical scanning.

In an initial state, the switch elements SW1 and SW2 are ON, and constant voltages are supplied from the constant voltage supply unit 229 to the holding capacitors C1 and C2.

Next, the switch element control line 108 is set to have a non-connection voltage (hereinafter, the non-connection voltage is at a Low level and a connection voltage is at a High level in the chart). This switches the switch element SW1 to an OFF state, which insulates between the voltage holding lines SHV1 and SHV2.

Next, the switch element control line 109 is set to have a non-connection voltage. This switches the switch element SW2 to an OFF state, which insulates between the voltage holding lines SHV2 and the bias voltage line bias1. In the reading period, when the switch element elements SW1 and SW2 are switched to an OFF state, it is possible to reduce noise from the bias voltage line bias1, and to maintain the voltage of the voltage holding line SHV1 of the gate terminal of the load transistor 222.

Next, the row selection control line 132 is switched to an ON state. This causes the row selection transistor 115 to become conductive.

Next, the reset control line 131 is switched to an ON state. This causes the reset transistor 113 to become conductive, which causes the voltage after the reset by the FD unit 116 as the reset voltage Vrst of the pixel 110 (i) to be output to the vertical common signal line 134 through the amplifier transistor 114, and then (ii) to be transferred to the column reading unit 103 located at a later stage.

Next, the photodiode 111 stores charge obtained through photoelectric conversion of light received during an exposure time period.

After the predetermined exposure time period, the transfer control line 130 is switched to an ON state. This causes the transfer transistor 112 to become conductive, which causes charge stored in the photodiode 111 to be transferred to the FD unit 116. The transferred charge as superimposition voltage (Vrst+Vsig) obtained by superimposing the signal voltage Vsig according to the amount of received light on the reset voltage Vrst of the pixel 110 is output to the vertical common signal line 134 through the amplifier transistor 114, and then is transferred to the column reading unit 103 located at the later stage.

In this way, by extracting a difference between signals generated as results of output performed twice, in other words, so-called double sampling operations, it is possible to obtain the signal voltage of the pixel 110 according to the amount of received light.

After obtaining the signal voltage, the switch element control line 109 is set to have a connection voltage first. This switches the switch element SW2 to an OFF state, which equalizes the potentials of the voltage holding line SHV2 and the bias voltage line bias1.

Next, the switch element control line 108 is set to have a connection voltage. This switches the switch element SW1 to an ON state, which equalizes the potentials of the voltage holding line SHV1 and the voltage holding line SHV2.

In other words, each time signal voltages of the pixels 110 in a row are read according to the method of driving the solid-state imaging device according to Embodiment 1, the switch element control line 108 performs (i) a period for holding a voltage of the gate terminal of the load transistor 222, in which the switch element control line 108 has a non-connection voltage, and (ii) a period for sampling a bias voltage, in which the switch element control line 108 has a connection voltage.

In the case of the pixels 110 of a two-pixels per cell type shown in FIG. 3, it is good to connect the transfer transistor 112 to the respective photodiodes 111A and 111B, and to thereby control them using two transfer control lines 130A and 130B. In this case, driving may be performed at timings as shown in FIG. 6.

Figure 6:
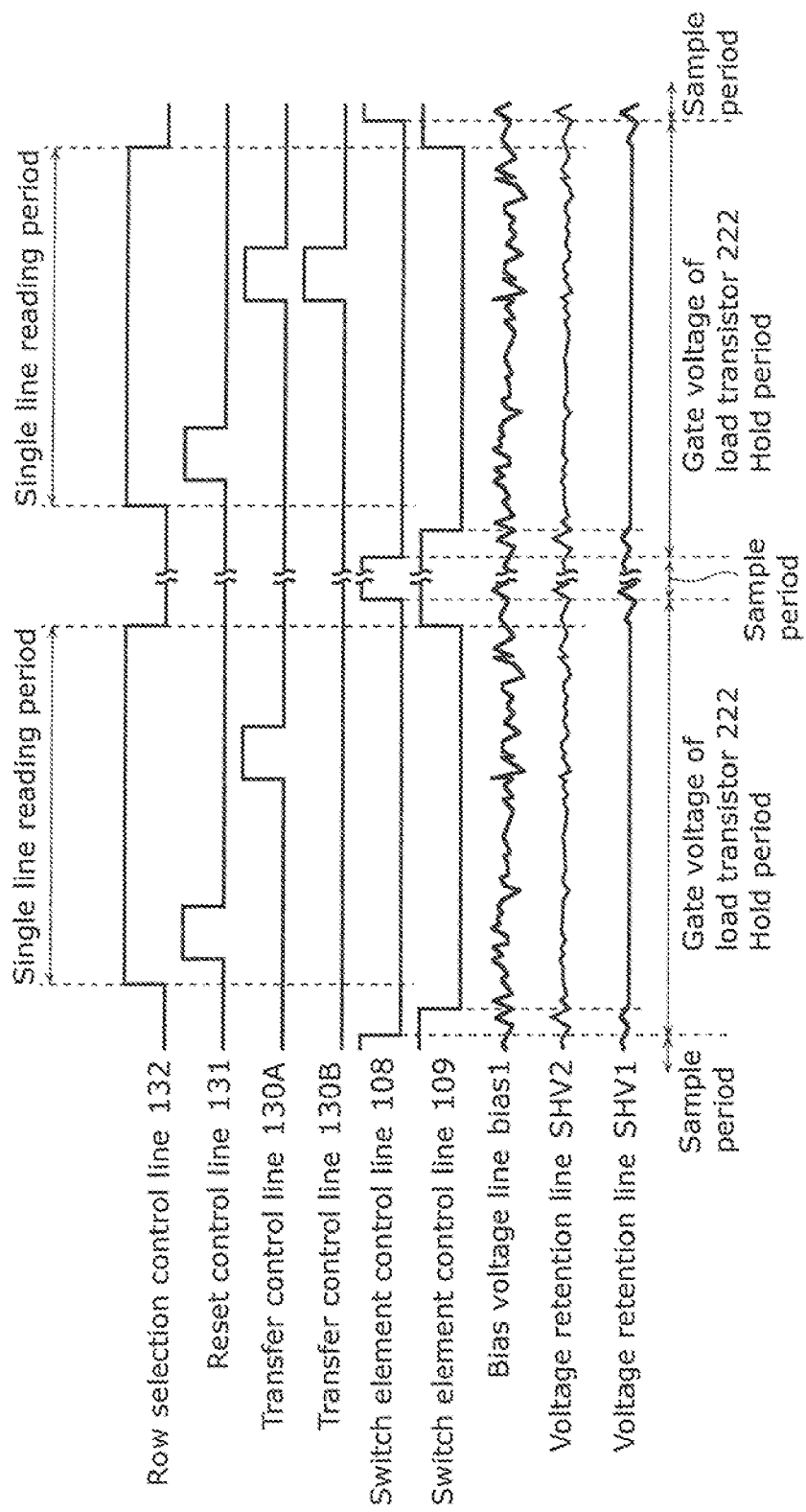
FIG. 6 is a timing chart showing a second driving example of the solid-state imaging device according to Embodiment 1.

FIG. 6 is a timing chart showing a second driving example of the solid-state imaging device according to Embodiment 1. Also in the chart, a period for holding a voltage of the gate terminal of the load transistor 222 and a period for sampling a bias voltage are performed each time signal voltages of the pixels 110 in a row are read. Here, it is only necessary that the voltage holding line SHV1 is held constant in the reading period from when the reset voltage Vrst is read to when the signal voltage Vsig is read. Thus, the switch elements SW1 and SW2 may be switched to a conductive (ON) state after the reset transistor 113 is switched to an OFF state.

Figure 7:
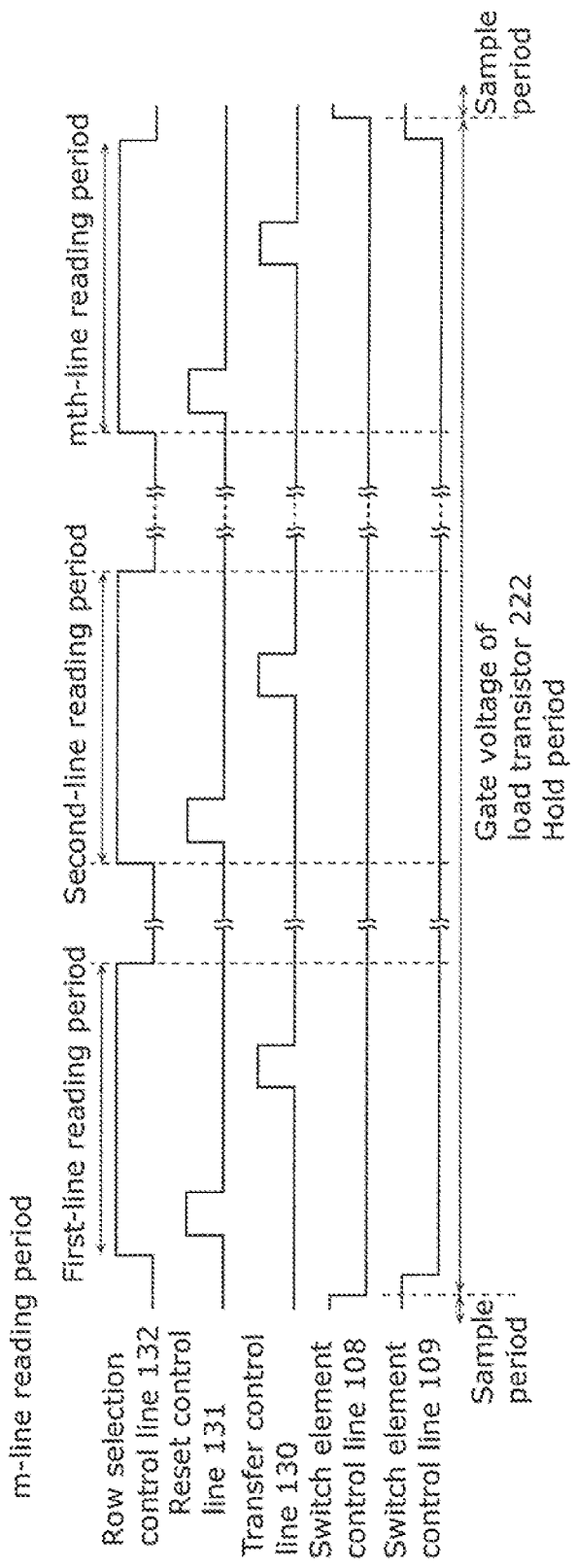
FIG. 7 is a timing chart showing a third driving example of the solid-state imaging device according to Embodiment 1.

FIG. 7 is a timing chart showing a third driving example of the solid-state imaging device according to Embodiment 1. As shown in the chart, intervals for switching the SW1 and SW2 to an ON state at intervals may be plural rows or plural frames. In other words, a driving method is possible which involves a period for reading plural rows may be assumed to be a hold period and at least one bias voltage sample period after reading the plural rows. The plural rows may be one or plural frames.

Here, the switch elements SW1 and SW2 are switched to ON states again after reading the pixel signals. As for the switch timings, the switch elements SW1 and SW2 may be switched at the same time, or any of them may be switched first. However, it is preferable that one of the switch elements which is closer to the bias voltage line bias1 be switched to an ON state and then the other switch element connected to the gate terminal of the load transistor 222 be switched, in order to reduce noise due to a current which flows to store charge in the holding capacitors C1 and C2. For example, it is preferable that, in this embodiment, the switch element SW2 be switched to an ON state first, and then the switch element SW1 be switched to an ON state.

Other than the driving methods shown in FIGS. 5 to 7, any driving method is possible which makes it possible to transfer reset voltages Vrst of the pixels 110 and signal voltages Vsig according to the amount of received light to the column reading unit 103.

In addition, when functions at a power-up, a resume form a stand-by are used, the holding capacitors C1 and C2 need to be fully charged before reading is started. In this embodiment, the driving methods in FIGS. 5 to 7 are shown as examples, assuming that the holding capacitors C1 and C2 are fully charged before reading is started.

Hereinafter, descriptions are given of examples of structures of functional blocks other than the column constant current source 102 in the solid-state imaging device in this embodiment.

Figure 8:
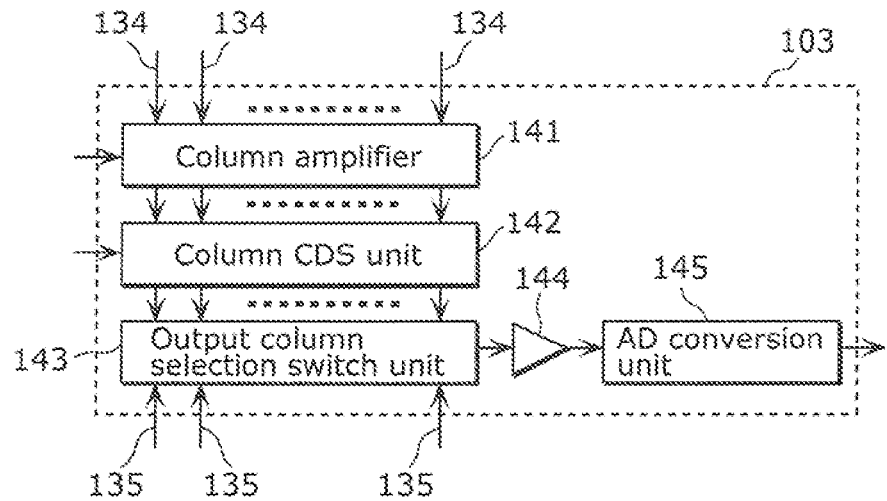
FIG. 8 is a block diagram showing a first example of a structure of a column reading unit according to Embodiment 1.

FIG. 8 is a block diagram showing a first example of a structure of a column reading unit according to Embodiment 1. As shown in the diagram, the column reading unit 103 includes: a column amplifier 141; a column correlated double sampling (CDS) unit 142; an output column selection switch unit 143, an output unit 144, an analog-to-digital (AD) conversion unit 145. The output signals from the pixel source follower are input to the column amplifier 141 through the vertical common signal line 134. From the reset voltage Vrst and the superimposition voltage (Vrst+Vsig) amplified by the column amplifier 141, a differential signal is extracted by double sampling operations in the column CDS unit 142. The differential signal which is an analog signal of the pixels 110 according to the amount of received light is transferred to the output column selection switch unit 143 at a later stage.

Figure 9:
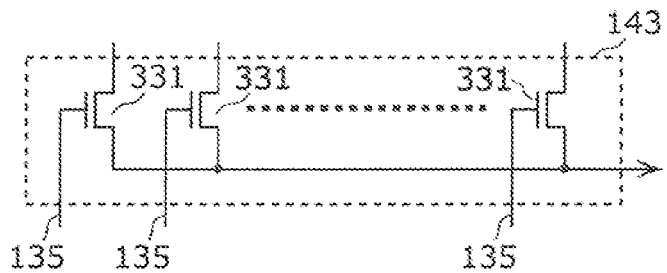
FIG. 9 is a circuit diagram showing an example of a structure of an output column selection switch unit according to Embodiment 1.

FIG. 9 is a circuit diagram showing an example of a structure of an output column selection switch unit according to Embodiment 1. The output column selection switch unit 143 shown in the diagram is configured to include column selection transistors 331. The signal voltage extracted in the column CDS unit 142 is input to the output unit 144 which is common for each column through the output column selection switch unit 143, and then is subjected to AD conversion by the AD conversion unit 145, and is transferred to the DSP 105.

The horizontal scanning unit 104 sequentially activates the column selection control lines 135, based on the signals from the timing generator 107. In this way, the column selection transistors 331 are sequentially selected and subjected to horizontal scanning. The signal voltages in the column selected in the horizontal scanning are transferred to the output unit 144.

Here, as shown in FIG. 8, the column reading unit 103 may be configured to have a different structure capable of performing a driving method involving sequentially selecting columns and supplying the analog signals thereof to the single AD conversion unit 145 so that these signals are subjected to the AD conversion, and outputting the resulting signals as digital signal values to outside. Alternatively, the column reading unit 103 may be configured to sequentially select the columns to output the digital signal values to outside after the AD conversion units provided for the respective columns perform AD conversion on the analog signals at the same time.

Figure 10:
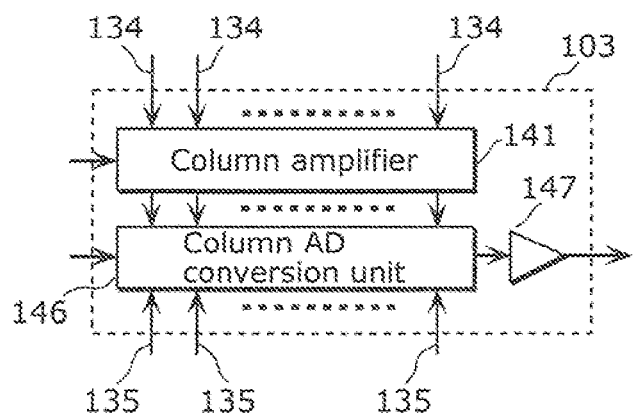
FIG. 10 is a block diagram showing a second example of a structure of a column reading unit according to Embodiment 1.

FIG. 10 is a block diagram showing a second example of a structure of a column reading unit according to Embodiment 1. As shown in the diagram, for example, the column reading unit may be configured to include a column amplifier 141 and a column AD conversion unit 146. The column AD conversion unit 146 is provided for the vertical common signal line 134, and converts voltages transferred from the vertical common signal line 134 corresponding to the column amplifier 141 to digital signals.

Figure 11:
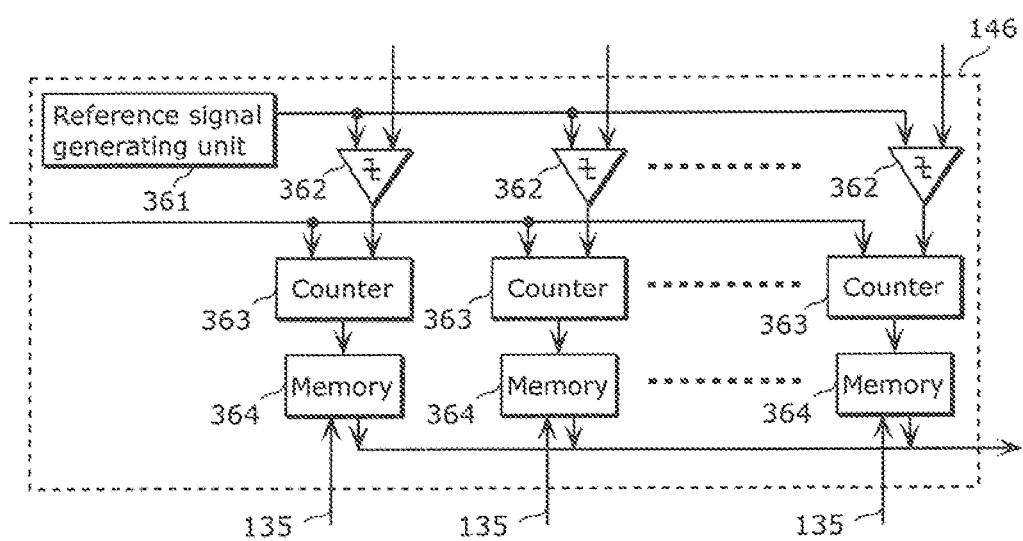
FIG. 11 is a block diagram showing an example of a structure of a column AD conversion unit included in the column reading unit.

FIG. 11 is a block diagram showing an example of a structure of the column AD conversion unit included in the column reading unit. In the following example described below, the column AD conversion unit 146 is an AD conversion unit of a so-called single slope type. However, an AD conversion unit of another AD conversion type such as sequential comparison is possible. As shown in FIG. 11, the column AD conversion unit 146 includes a reference signal generating unit 361, a comparator 362, a counting unit (counter) 363, and a memory unit 364.

The reference signal generating unit 361 generates a reference signal voltage (ramp waveform signal voltage) Vramp which gradually changes as time passes. The reference signal voltage Vramp may be either a waveform having a gradual slope shape or a step-shaped waveform. The waveform is not limited to any particular one as long as it has a tilted shape. The tilt of the reference signal voltage Vramp may be either positive or negative in the same manner. The reference signal generating unit 361 may be configured to have another structure as long as it can generate a waveform having a tilted shape. For example, the reference signal generating unit 361 may be configured to provide a code value which increases or decreases to the digital-to-analog (DAC) converter, and filter the outputs by the DAC. In addition, the reference signal generating unit 361 may be configured to cause integration operations using capacitor elements.

The comparator unit 362 compares levels of the signal voltage amplified through the column amplifier circuit from the vertical common signal line 134 and the reference signal voltage Vramp generated by the reference signal generating unit 361. The comparator unit 362 may be a differential comparator having a known offset cancel function. However, the comparator unit 362 may have any structure as long as it can compare the signal voltage amplified through the column amplifier circuit from the vertical common signal line 134 and the reference signal voltage Vramp generated by the reference signal generating unit 361. For example, it may be a so-called chopper comparator, or the like.

For AD conversion, the counter 363 counts time from when the comparator unit 362 starts comparison to when the result of the comparison by the comparator unit 362 changes, in other word, to when the voltage level relationship between the signal voltage amplified through the column amplifier circuit from the vertical common signal line 134 and the reference signal voltage Vramp generated by the reference signal generating unit 361 (to when the output by the comparator unit 362 is reversed). More specifically, for AD conversion, the counter 363 counts input clocks from when the comparison is started to when the voltage level relationship between the signal voltage and the reference signal voltage Vramp changes. After the AD conversion, the counter 363 transmits a digital signal value (count value) to the memory unit 364, and the memory unit 364 stores the transmitted digital signal value. The AD conversion is performed on each of the reset voltage Vrst and the superimposition voltage (Vrst+vsig). The difference between the conversion results is the signal voltage of the pixel 110. Although the double sampling operations using the column AD conversion unit 146 have been described above as an example, another structure is possible in which only the signal voltage Vsig is subjected to AD conversion.

Digital signal values stored for each row in the memory unit 364 are sequentially transferred to the output unit 147. The digital signal values are transferred from the memory unit 364 to the output unit 147, based on the signals from the timing generator 107, by means of the horizontal scanning unit 104 sequentially activating the plurality of column selection control lines 135.

The output unit 147 outputs the transferred digital signal values to outside. The output unit 147 may be a high-speed transfer circuit using, for example, low voltage differential signaling (LVDS). Here, the output 147 may be a circuit having any structure that allows output of digital signal values. In addition, as for the output unit 147, an output format may be any one, an output type may be either serial output or parallel output, and for example the number of output ports is not particularly limited.

The column amplifier 141 and the column CDS unit 142 are included in the column reading unit 103 shown in FIG. 8. However, the column reading unit 103 may be configured without one or both of the column amplifier 141 and the column CDS unit 142. Likewise, the column amplifier 141 included in the column reading unit 103 shown in FIG. 10 does not always need to be included. It is to be noted here that the column amplifier 141 if provided can increase a signal voltage to be transmitted to a later stage. For this reason, it is possible to increase the input S/N in the AD conversion, and to thereby enhance the image quality obtainable by the solid-state imaging device.

In addition, the column amplifier 141 is only necessary to be an inverter amplifier of a so-called single end type, which drives a constant-current load using a source-grounded amplifier circuit. Here, a signal amplifier means having any structure is possible, for example, a differential amplifier circuit is one such possibility.

In addition, a sample and hold means may be provided for sampling and holding signals to be input to the AD conversion unit. By providing the sample and hold means for signals to be input to the AD conversion unit, it is possible to cause, in parallel, AD conversion operations and reading signals from the pixels 110 to the vertical common signal line 134, in other word, perform so-called pipeline operations. In this way, it is possible to increase the frame rate of the solid-state imaging device.

The voltage holding circuit 230 according to this embodiment is configured to include a two-stage connection S/H circuit in which S/H circuits each having a switch element and a holding capacitor are arranged in two stages. However, a connection S/H circuit in which such S/H circuits are arranged in three or more stages may be used instead.

Variation of Embodiment 1

Figure 12:
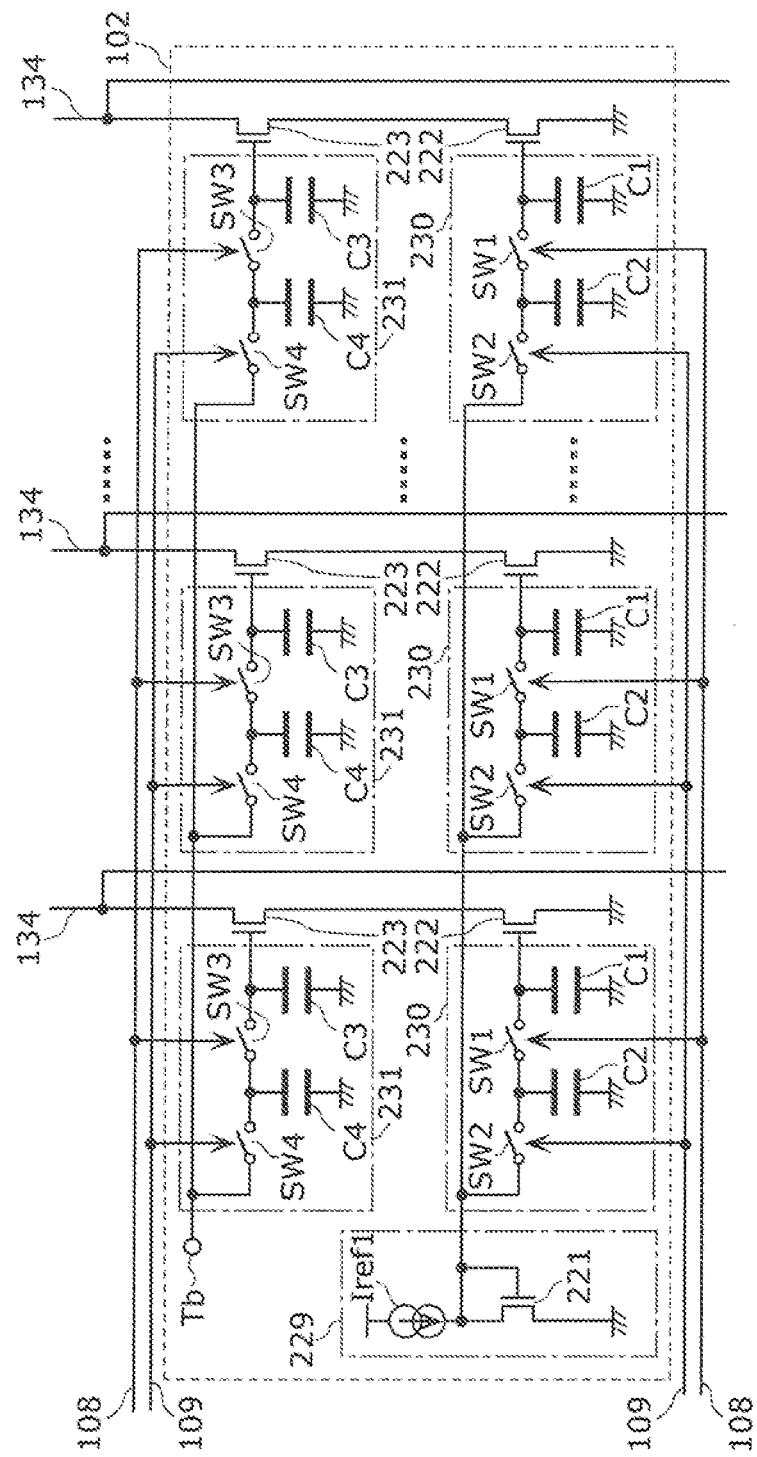
FIG. 12 is a circuit diagram showing a column constant current source according to a first variation of Embodiment 1.

FIG. 12 is a circuit diagram showing a column constant current source according to a first variation of Embodiment 1. The column constant current source 102 shown in the diagram can hold, with a high accuracy, a current which is supplied to an amplifier transistor 114 of a pixel 110 even when a voltage of a vertical comment signal line 134 changes, and has a function of reducing noise in the bias circuit. With this structure, it is possible to further enhance image quality.

The column current source shown in FIG. 12 is different from the column constant current source shown in FIG. 4 in the points of (i) additionally including a column constant current source transistor 223 between the vertical common signal line 134 and either the source terminal or the drain terminal of the load transistor 222, and (ii) additionally including a voltage holding circuit 231 provided at the gate terminal of the column constant current source transistor 223 of each row.

Similarly to the voltage holding circuit 230, the voltage holding circuit 231 is a second multi-stage sample and hold circuit composed of a plurality of sample and hold circuits for sampling and holding voltages connected in multiple stages. Each sample and hold circuit includes switch elements SW2 and SW4 and holding capacitors C3 and C4, is connected to the gate terminal of the column constant current source transistor 223. The holding capacitor C3 has an electrode which is connected to one of the terminals of the switch element SW3 and the gate terminal of the column constant current source transistor 223, and the other electrode which is grounded. The holding capacitor C4 has an electrode which is connected to one of the terminals of the switch element SW3 and one of the terminals of the switch element SW4, and the other electrode which is grounded. The other terminal of the switch element SW4 is connected to a voltage input terminal Tb. The switch elements SW3 and SW4 are switched between a conductive (ON) state and a non-conductive (OFF) state by the timing generator 107 respectively through the switch element control lines 108 and 109.

The gate terminal of the column constant current source transistor 223 in each column is connected to at least one common voltage input terminal Tb through the voltage holding circuit 231 in the row. To the voltage input terminal Tb, a constant voltage is supplied by a bias circuit etc. The voltage holding circuit 231 performs operations at timings similarly to the voltage holding circuit 230 described with reference to FIG. 4, and thus no detailed descriptions are repeated here.

The switch element SW3 and the holding capacitor C3 constitute a third sample and hold circuit, and the switch element SW4 and the holding capacitor C4 constitute a second sample and hold circuit.

Here, any of the capacitance values of the capacitors C3 and C4 may be larger than the other, C3>C4 is preferable. The reason is that, in a hold period, charge stored in the capacitor C3 decreases gradually due to, for example, leakage from the gate of the transistor, which changes a voltage between the capacitor C3, that is, a voltage of the gate terminal of the load transistor 222. As a result, a current to be supplied to the amplifier transistor 114 changes, generating noise. For this reason, in the limited area, there is a need to increase the size of the capacitor C3 as much as possible, and to decrease the amount of change in the voltage of the gate terminal of the load transistor 222 against charge leakage. On the other hand, areas for the capacitors C3 and C4 are limited, and thus it is difficult to increase both of the areas of the capacitors C3 and C4. Thus, the capacitance of the capacitor C4 is only necessary to be reduced to an extent that does not affect the effect of noise reduction. By increasing the capacitance of the capacitor C3 by the amount of reduction in the capacitance of the capacitor C4, it is possible to provide the effect of reducing the amount of change in the voltage of the gate terminal of the load transistor 222 against the leakage of charge stored in the capacitor C3.

As shown in FIG. 12, with the column constant current source transistor 223 and the voltage holding circuit 231 connected to the gate terminal of the column constant current source transistor 223, it is possible to hold, with a high accuracy, a current to be supplied to the amplifier transistor 114 even when a voltage of the vertical common signal line 134 changes, and to reduce noise from the voltage input terminal Tb to which the bias circuit etc. are connected to the gate terminal of the column constant current source transistor 223. Therefore, it is possible to further enhance the image quality.

Embodiment 2

Next, a structure of a solid-state imaging device according to Embodiment 2 and operations performed thereby are described with reference to the drawings. Hereinafter, descriptions are given of only differences from the solid-state imaging device according to Embodiment 1. The same descriptions are not repeated for the same structural elements as those in the solid-state imaging device according to Embodiment 1, among the structural elements of the solid-state imaging device according to this embodiment.

Figure 13:
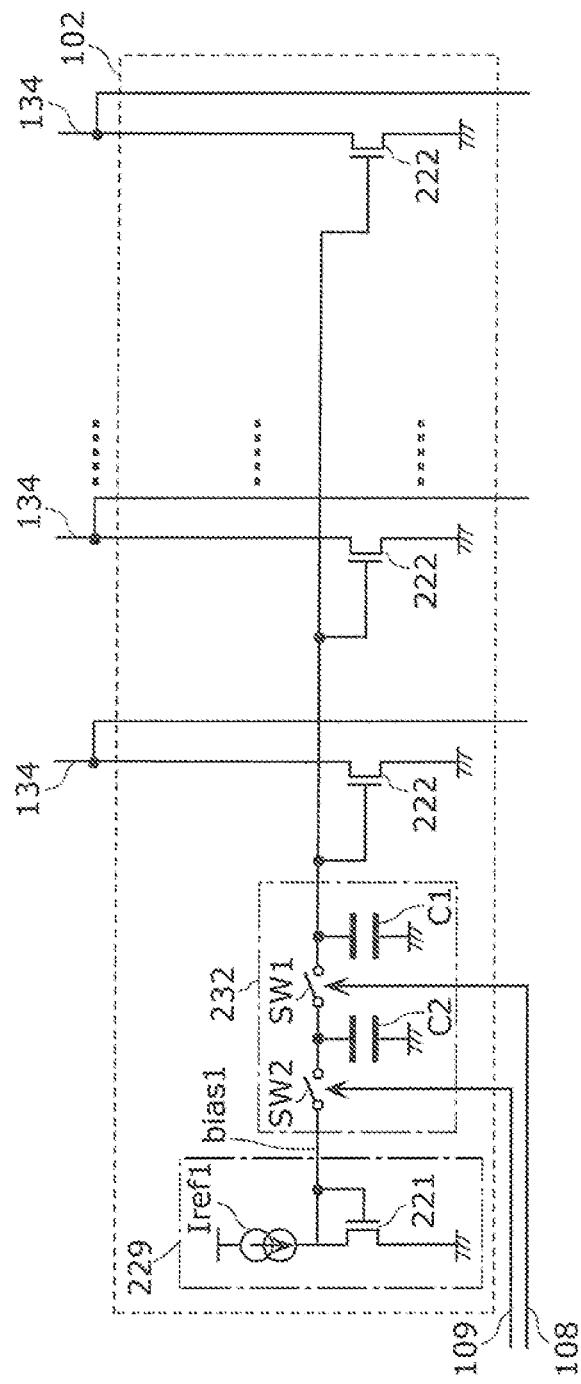
FIG. 13 is a circuit diagram showing an example of a column constant current source according to Embodiment 2.

FIG. 13 is a circuit diagram showing an example of a column constant current source according to Embodiment 2. In FIG. 13, the same structural elements as those of the column constant current source 102 according to Embodiment 1 are assigned with the same reference numerals. In addition, details overlapping with Embodiment 1 are not described in detail.

The column constant current source according to this embodiment is different from the column constant current source according to Embodiment 1 in the points that the gate terminals of load transistors 222 in each column are connected to the gate terminals of load transistors 222 in another column, and that the gate electrodes in the columns are connected to a common bias voltage line bias1 through a voltage holding circuit 232 for common use. With this structure, it is possible to achieve further circuit area reduction.

The voltage holding circuit 232 is the same in structure as the voltage holding circuit 230 shown in Embodiment 1, and thus no detailed descriptions are repeated here.

The gate terminals of the load transistors 222 in the column are connected to the gate electrodes of the load transistors 222 in the columns, and are connected to the bias voltage line bias1 of the constant voltage supply unit 229 through the voltage holding circuit 232 for common use. The constant voltage supply unit 229 is the same as shown in Embodiment 1, and thus no description is repeated here.

The voltage holding circuit 232 performs operations at timings similarly to the voltage holding circuit 230 according to Embodiment 1, and thus no detailed descriptions are repeated here.

As shown in FIG. 13, with the voltage holding circuit 232 for common use provided in each of the gate terminals of the load transistors 222 in the columns, it is possible to achieve further circuit area reduction.

Variation of Embodiment 2

Figure 14:
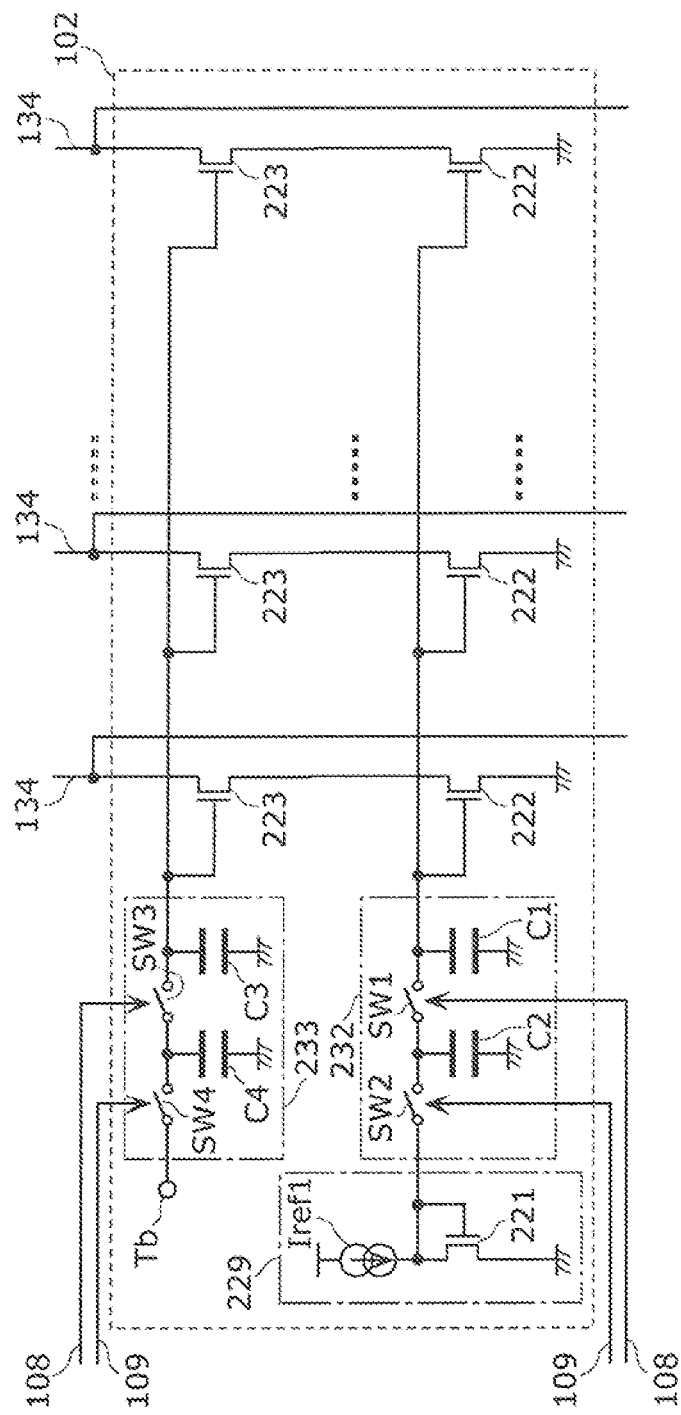
FIG. 14 is a circuit diagram showing a column constant current source according to a first variation of Embodiment 2.

FIG. 14 is a circuit diagram showing a column constant current source according to a first variation of Embodiment 2. The column constant current source 102 shown in the diagram can hold, with a high accuracy, a current which is supplied to the amplifier transistor 114 of the pixel 110 even when a voltage of the vertical comment signal line 134 changes, and has a function of reducing noise in the bias circuit. With this structure, it is possible to further enhance image quality.

The column current source shown in FIG. 14 is different from the column constant current source shown in FIG. 13 in the points of (i) additionally including a column constant current source transistor 223 between the vertical common signal line 134 and either the source terminal or the drain terminal of the load transistor 222, and (ii) additionally including a voltage holding circuit 233 provided at the gate terminal of the column constant current source transistor 223.

The voltage holding circuit 233 is the same in structure as the voltage holding circuit 231 shown in Embodiment 1, and thus no detailed descriptions are repeated here.

The gate terminal of the column constant current source transistors 223 in the row are connected to the gate terminal of the column constant current source transistors 223 in other columns, and are connected to at least one common voltage input terminal Tb through the voltage holding circuit 233 for common use. To the voltage input terminal Tb, a constant voltage is supplied by a bias circuit etc.

As in the voltage holding circuit 232, the switch elements SW3 and SW2 are switched between a conductive (ON) state and a non-conductive (OFF) state by the timing generator 107 respectively through the switch element control lines 108 and 109.

The voltage holding circuit 233 performs operations at timings similarly to the voltage holding circuit 231 according to Embodiment 1, and thus no detailed descriptions are repeated here.

As shown in FIG. 14, with (i) the column constant current source transistor 223, (ii) the gate terminal of the column constant current source transistors 223 in the column connected to the gate terminal of the column constant current source transistors 223 in the other columns, and (iii) the voltage holding circuit 233 for common use, it is possible to hold, with a high accuracy, a current to be supplied to the amplifier transistor 114 of each pixel 110 even when a voltage of the vertical common signal line 134 changes, and to reduce noise from the voltage input terminal Tb to which the bias circuit etc. are connected to the gate terminal of the column constant current source transistors 223. Therefore, it is possible to further enhance the image quality. Furthermore, it is possible to achieve further circuit area reduction.

Although the solid-state imaging device according to Embodiment 1 is configured to include the voltage holding circuits 230 and 231 for each column, the solid-state imaging device according to Embodiment 2 is configured to include the common voltage holding circuits 230 and 231. However, the solid-state imaging device according to Embodiment 2 may be configured to include a voltage holding circuits 230 and 231 for each column.

Figure 15:
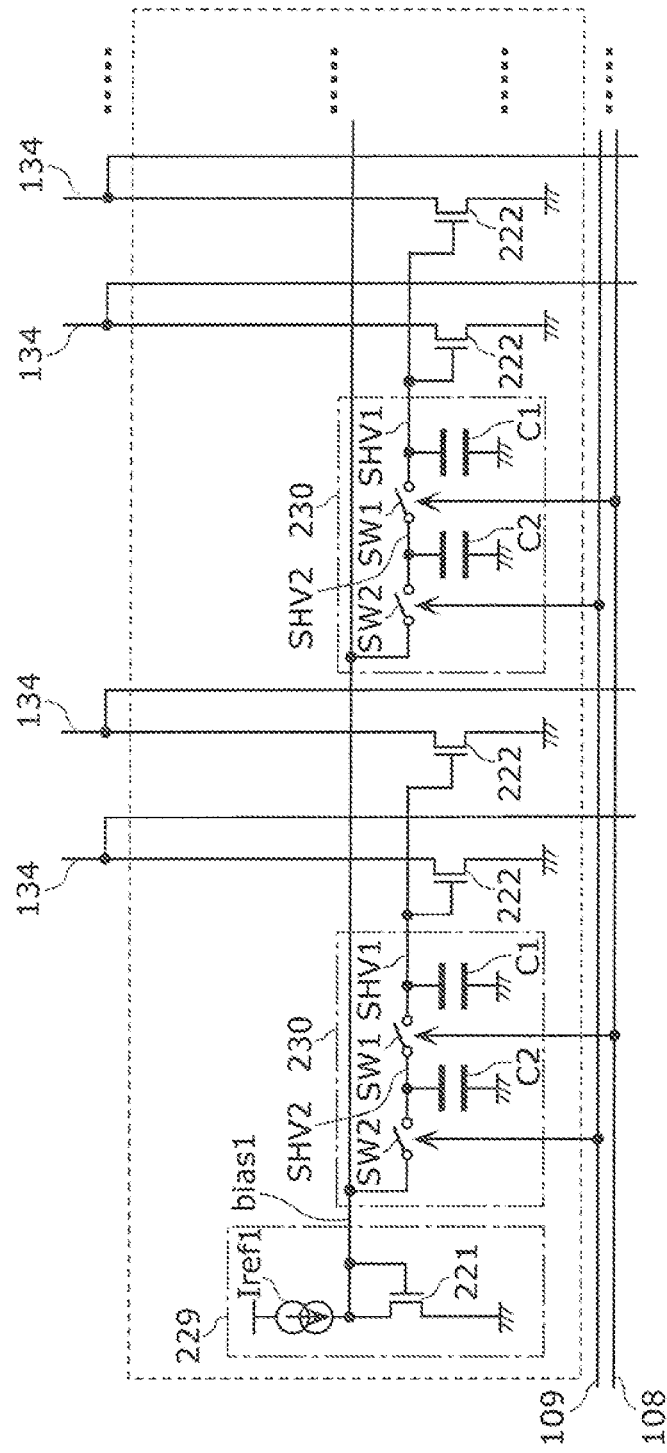
FIG. 15 is a circuit diagram showing a column constant current source according to a second variation of Embodiments 1 and 2.
Figure 16:
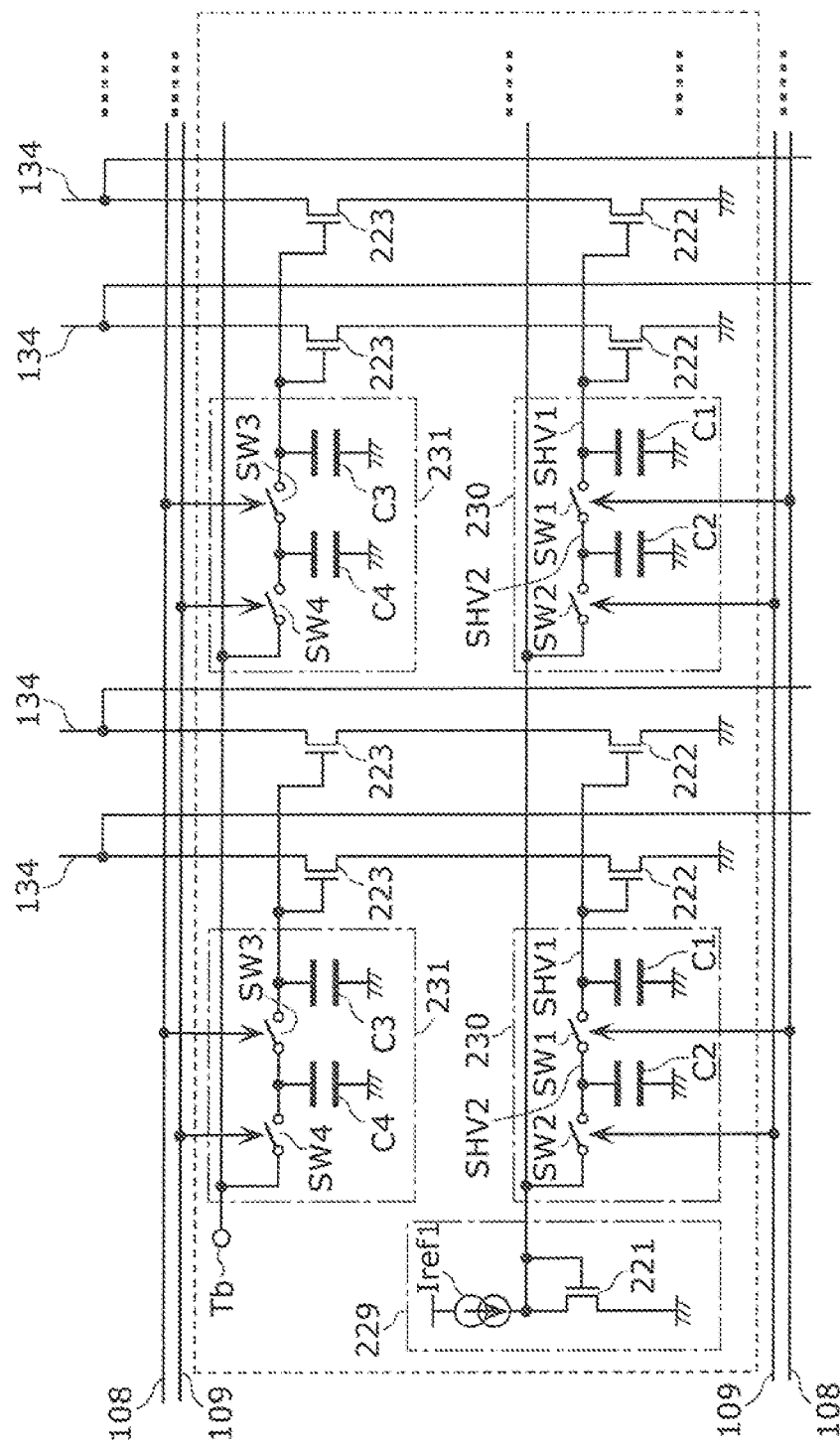
FIG. 16 is a circuit diagram showing a column constant current source according to a third variation of Embodiments 1 and 2.

FIG. 15 is a circuit diagram showing a column constant current source according to a second variation of Embodiments 1 and 2. FIG. 16 is a circuit diagram showing a column constant current source according to a third variation of Embodiments 1 and 2. As shown in FIGS. 15 and 16, for example, an exemplary structure is shown which includes a common voltage holding circuit provided for every two columns.

Embodiment 3

Next, a structure of a solid-state imaging device according to Embodiment 3 and operations performed thereby are described with reference to the drawings. Hereinafter, descriptions are given of only differences from the solid-state imaging device according to Embodiment 1. The same descriptions are not repeated for the same structural elements as those in the solid-state imaging device according to Embodiment 1 shown in FIG. 1, among the structural elements of the solid-state imaging device according to this embodiment.

Figure 17:
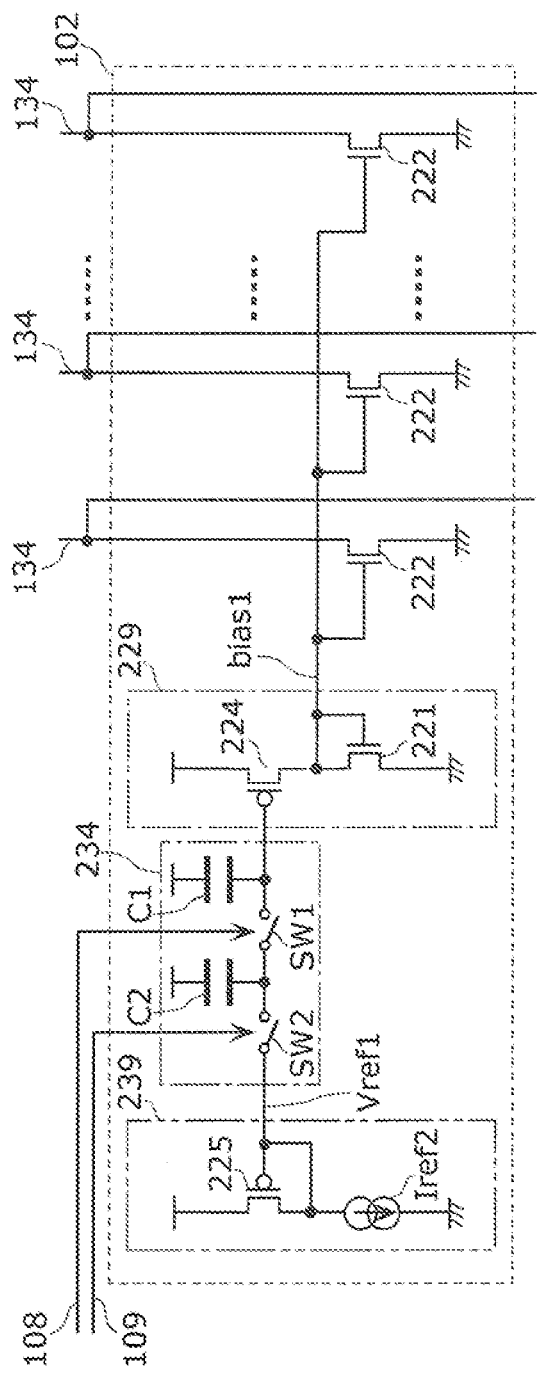
FIG. 17 is a circuit diagram showing an example of a column constant current source according to Embodiment 3.

FIG. 17 is a circuit diagram showing an example of a column constant current source according to Embodiment 3. In FIG. 17, the same structural elements as those of the column constant current source 102 according to Embodiment 1 are assigned with the same reference numerals. In addition, details overlapping with Embodiment 1 are not described in detail.

In Embodiments 1 and 2, descriptions are given of the method for reducing noise using the voltage holding circuit which is connected to the gate terminal of the load transistor 222. However, noises are generated not only in the constant voltage supply unit 229 which supplies a constant voltage to the gate terminal of the load transistor 222, but only in the reference voltage source 239 which supplies a constant voltage to the gate terminal of the current source transistor 224 which constitutes the constant voltage supply unit 229. The reference voltage source 239 is configured with, for example, a circuit called a band-gap reference circuit (hereinafter, referred to as a BGR circuit). Such a BGR circuit is configured with a comparatively large number of elements, and thus has a noise problem. In addition, the reference voltage source 239 and the constant voltage supply unit 229 may have therebetween a long line (corresponding to a reference voltage line Vref1 or the like in FIG. 17), depending on an arrangement in a chip. In such a case, noise due to the line itself and influence of the noise from a peripheral circuit make it difficult to supply a constant voltage to the constant voltage supply unit 229. For this reason, noise in the reference voltage line Vref1 also needs to be suppressed.

The solid-state imaging device according to this embodiment has a structure of reducing noise in the reference voltage line Vref1, and thereby stabilizes a voltage in the gate terminal of the current source transistor 224 of the constant voltage supply unit 229. This embodiment is different from Embodiment 1 in that the gate terminal of the current source transistor 224 is connected to the reference voltage line Vref1 through the voltage holding circuit 234. The current source transistor 224 constitutes the constant voltage supply unit 229, which is a so-called bias circuit, and supplies a constant voltage to the gate terminal of each load transistor 222 in each column.

With this structure, it is possible to reduce problematic noise in the reference voltage line Vref1 in the case of such a long line between the reference voltage source 239 and the constant voltage supply unit 229, and to stabilize a voltage in the gate terminal of the current source transistor 224 in the constant voltage supply unit 229, and thereby to stabilize a reference current in the constant voltage supply unit 229. As a result, it is possible to supply a constant voltage to the gate terminal of the load transistor 222. Thus, it is possible to achieve reduction in noise and circuit area.

Compared to the voltage holding circuit 230 shown in Embodiment 1, the voltage holding circuit 234 has a structure that is different in that one of the electrodes of holding capacitors C1 and C2 is connected to the gate terminal of the current source transistor 224 formed with a PMOS and the other electrode is connected to the power source voltage supply circuit. However, the holding capacitors C1 and C2 are intended to maintain a constant voltage between the electrode connected to the gate terminal of the current source transistor and the electrode connected to the reference potential supply circuit (the power source voltage supply circuit or the GND voltage supply circuit). On the other hand, in the case of the current source transistor (for example, the load transistor 222) formed with an NMOS, as in the case of the voltage holding circuit 230 in Embodiment 1, it is only necessary that one of the electrodes is connected to the gate terminal of the current source transistor, and the other is connected to the GND voltage supply circuit. Since the difference in structure is between the PMOS and the NMOS, no detailed description is provided here. In other words, the reference voltage supply circuit is a power source voltage supply circuit in the case where the current source transistor is a PMOS, and is a GND voltage supply circuit in the case where the current source transistor is an NMOS.

The gate terminal of the current source transistor 224 which constitutes the constant voltage supply unit 229 which supplies a constant voltage to the gate terminal of the load transistor 222 in each column is connected to the reference voltage line Vref1 through the voltage holding circuit 234. The constant voltage supply unit 229 has a transistor 221 for driving a load transistor and a current source transistor 224. The gate terminal of the current source transistor 224 is connected to the reference voltage line Vref1 through the voltage holding circuit 234. One of the source terminal and the drain terminal of the current source transistor 224 is connected to (i) one of the gate terminal, the source terminal, and the drain terminal of the transistor 221 for driving the load transistor and (ii) the gate terminal of the load transistor 225 in each column, and the other of the current source transistor 224 is connected to the power source.

The constant voltage generated by the reference voltage source 239 is supplied to the gate terminal of the current source transistor 224 through the reference voltage line Vref1 and the voltage holding circuit. The voltage holding circuit 234 performs operations at timings similarly to the voltage holding circuit 230 according to Embodiment 1, and thus no detailed descriptions are repeated here.

Figure 18:
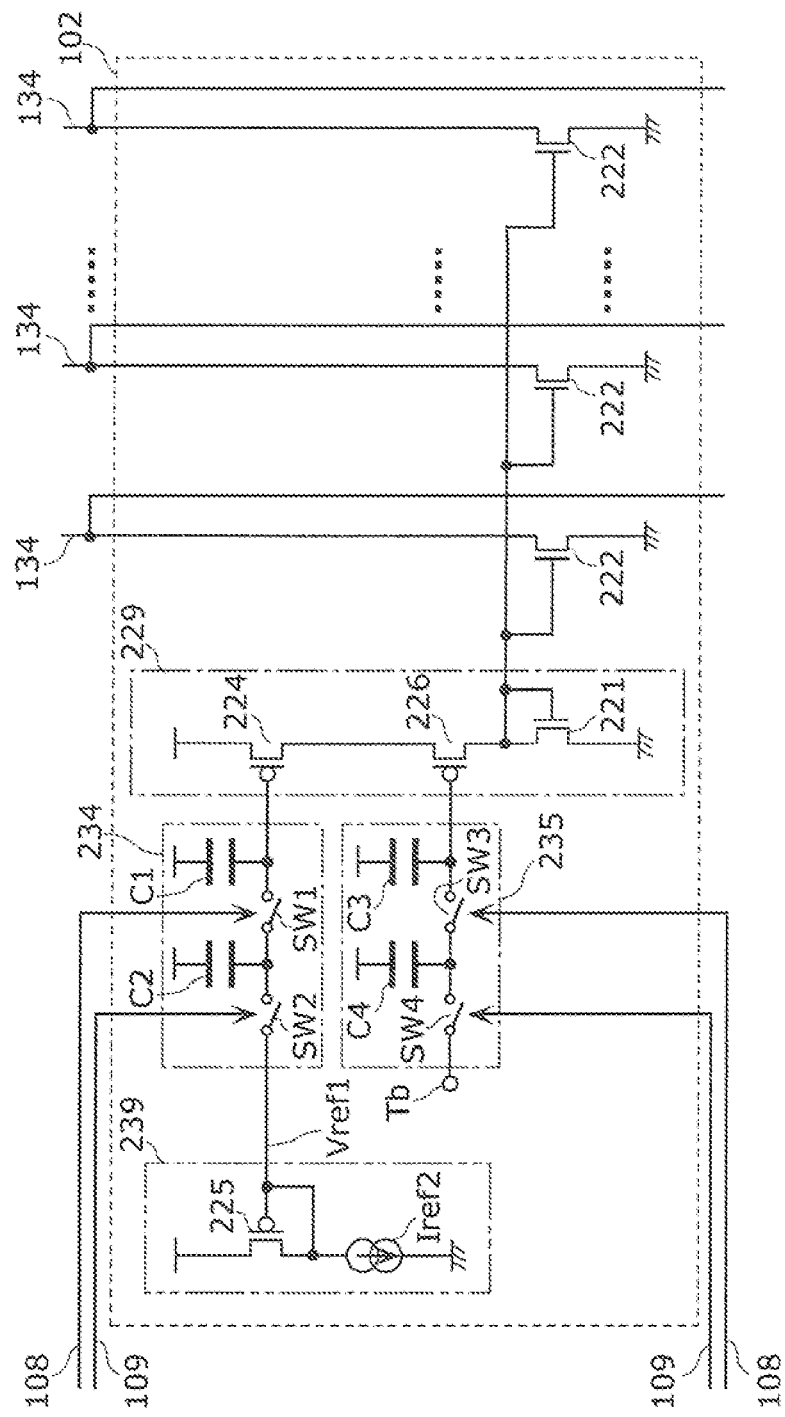
FIG. 18 is a circuit diagram showing a column constant current source according to a first variation of Embodiment 3.

FIG. 18 is a circuit diagram showing a column constant current source according to a first variation of Embodiment 3. As shown in the diagram, with the column constant current source 102 further including (i) the constant current source transistor 226 which is connected in series to the current source transistor 224 and (ii) the voltage holding circuit 235 connected to the gate terminal of the constant current source transistor 226, it is possible to hold, with a high accuracy, a current to be supplied to the transistor 221 for driving the load transistor even when a potential of the vertical common signal line 134 changes, and to reduce noise from the voltage input terminal Tb to which the bias circuit etc. are connected to the gate terminal of the constant current source transistor 226. Therefore, it is possible to further enhance the image quality.

Although the constant voltage supply unit 229 is illustrated as the bias circuit of the load transistor 222, any voltage source circuit which generates a voltage, for example, a BGR circuit, or a resistance voltage-dividing circuit is possible without deviating from the object and scope of the present invention. Although the reference voltage source 239 is illustrated as a pre-stage of the constant voltage supply unit 229, any voltage source circuit which generates a voltage, for example, a BGR circuit, or a resistance voltage-dividing circuit is possible without deviating from the object and scope of the present invention.

Figure 19:
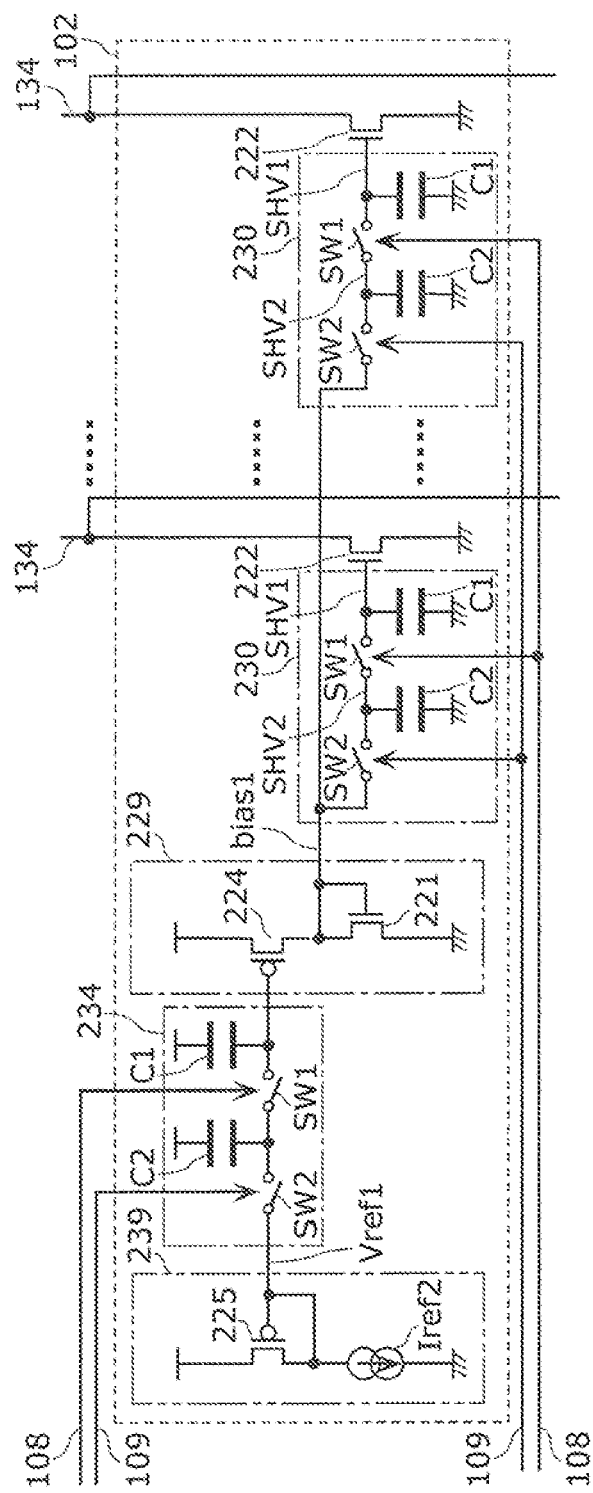
FIG. 19 is a circuit diagram showing a column constant current source according to a second variation of Embodiment 3.

FIG. 19 is a circuit diagram showing a column constant current source according to a second variation of Embodiment 3. As shown in the diagram, a voltage holding circuit may be provided to both of the gate terminal of the load transistor 222 and the gate terminal of the current source transistor 224 of the constant voltage supply unit 229. Furthermore, in FIG. 19, as shown in FIG. 12, FIG. 14, FIG. 16, and FIG. 18, even in the case where at least one of the column constant current source transistor 223 and the constant current source transistor 226 is provided, a voltage holding circuit may be provided to both of the gate terminal of the column constant current source transistor 223 and the constant current source transistor 226. Furthermore, a voltage holding circuit may be provided to the gate terminal of a transistor which operates as a current source in the chip.

Although the voltage holding circuit described in this embodiment is configured with a two-stage connection S/H circuit including S/H circuits each having a switch element and a holding capacitor, the voltage holding circuit may be configured with a multi-stage connection S/H circuit.

Embodiment 4

Figure 20A:
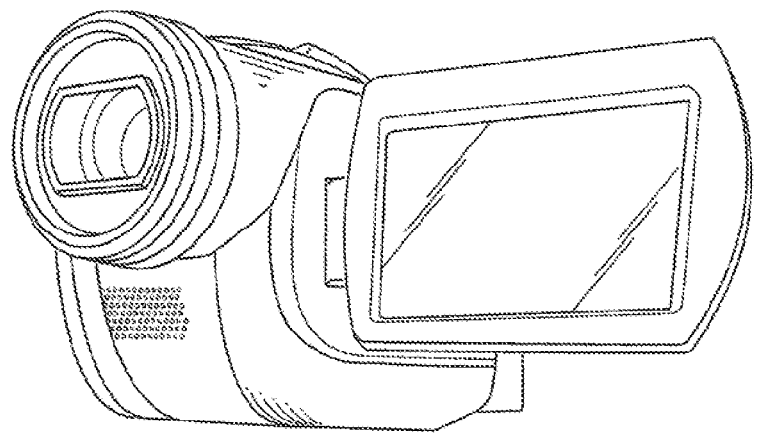
FIG. 20A is an external view of an example of a video camera.
Figure 20B:
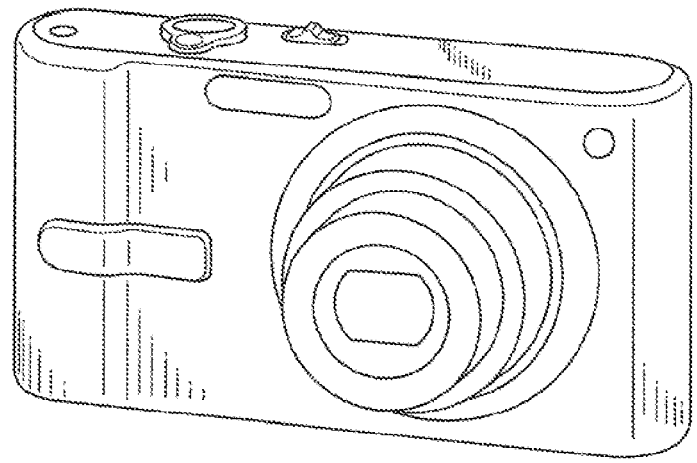
FIG. 20B is an external view of an example of a digital still camera.

Each of the solid-state imaging devices according to Embodiments 1 to 3 and the variations thereof is suitable for a video camera shown in FIG. 20A, a digital still camera shown in FIG. 20B, and furthermore for an imaging device (an image input device) in or as a camera module or the like for a mobile device such as a mobile phone.

Figure 21:
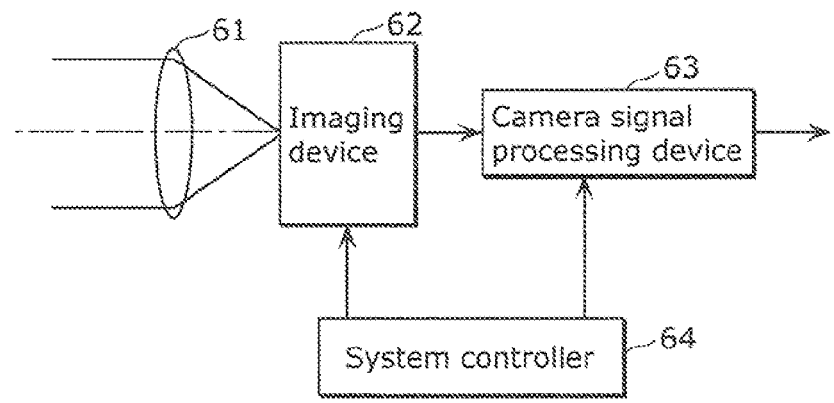
FIG. 21 is a block diagram showing an example of a structure of an imaging device.
Figure 22:
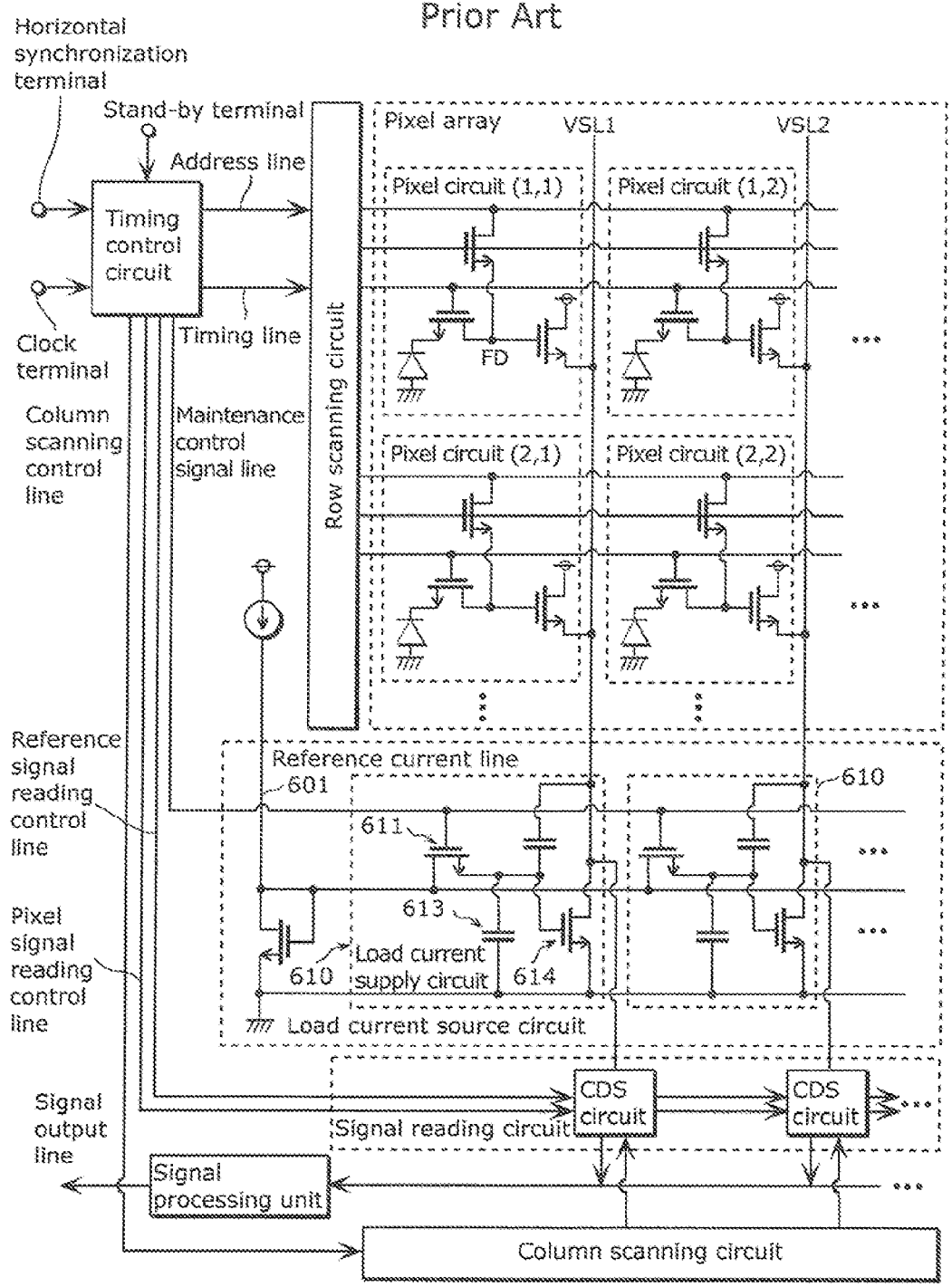
FIG. 22 is a circuit block diagram of a solid-state imaging device disclosed in Patent Literature 1.

FIG. 21 is a block diagram showing an example of a structure of an imaging device. As shown in FIG. 21, the imaging device according to this embodiment includes an optical system including a lens 61, an imaging device 62, a camera signal processing circuit 63, a system controller 64, etc. The lens 61 receives light from a subject and forms an image on an imaging surface of the imaging device 62. The imaging device 62 outputs an image signal obtained by converting the image formed on the imaging surface by the lens 61 into an electric signal on a per pixel basis. As this imaging device 62, it is possible to use any one of the solid-state imaging devices according to the above-described Embodiments 1 to 3 and the variations thereof.

The camera signal processing circuit 63 performs various kinds of signal processing on the image signal to be output from the imaging device 62. The system controller 64 controls the imaging device 62 and the camera signal processing circuit 63.

In this way, the imaging device according to this embodiment is capable of stabilizing a voltage of the gate terminal of the load transistor which supplies a constant current to the amplifier transistor of each pixel, and includes the imaging device 62 configured to achieve reduction in noise and circuit area.

Although the solid-state imaging devices and the imaging device including any of them are disclosed based on the embodiments etc. above, solid-state imaging devices and imaging devices according to the present invention are not limited to the ones in the embodiments etc. The herein disclosed subject matter is to be considered descriptive and illustrative only, and the appended Claims are of a scope intended to cover and encompass not only the particular embodiments disclosed above, but also equivalent structures, methods, and/or uses.

INDUSTRIAL APPLICABILITY

The solid-state imaging device according to the present invention is capable of reducing noise in a reduced circuit area, and thus is applicable to mobile phones, digital still cameras, movie cameras, and so on.

The invention claimed is:

1. A solid-state imaging device comprising:
a pixel unit in which a plurality of pixels are arranged in a matrix;
a plurality of vertical common signal lines each of which is provided for a corresponding one of columns of the plurality of pixels, and reads signals of pixels in the corresponding column; and
a column constant current source which supplies a current to the plurality of vertical common signal lines,
wherein the column constant current source comprises:
a plurality of load transistors each having a source terminal and a drain terminal one of which is connected to one of the plurality of vertical common signal lines and the other of which is grounded;
a constant voltage supply unit which includes a current source transistor and supplies a voltage to gate terminals of the plurality of load transistors; and
a first multi-stage sample and hold circuit in which sample and hold circuits for sampling and holding the voltage are connected in multiple stages, the first multi-stage sample and hold circuit stabilizing the voltage which is supplied to the gate terminals of the plurality of load transistors,
wherein the solid-state imaging device further comprises a reference voltage source which includes a reference current source and supplies a voltage to a gate terminal of the current source transistor, and
the gate terminal of the current source transistor and the reference voltage source are connected to each other via the first multi-stage sample and hold circuit.

2. The solid-state imaging device according to claim 1, wherein a gate terminal of at least one of the load transistors and the constant voltage supply unit are connected to each other via the first multi-stage sample and hold circuit.

3. The solid-state imaging device according to claim 2, wherein the first multi-stage sample and hold circuit includes a first sample and hold circuit and a second sample and hold circuit,
the first sample and hold circuit includes:
a first holding capacitor having an electrode connected to a reference potential supply circuit and an other electrode connected to the gate terminal of the load transistor; and
a first switch element having a terminal connected to the gate terminal of the load transistor, and
the second sample and hold circuit includes:
a second holding capacitor having an electrode connected to the reference potential supply circuit and an other electrode connected to an other terminal of the first switch element; and
a second switch element having a terminal connected to the other terminal of the first switch element and an other terminal connected to the constant voltage supply unit.

4. The solid-state imaging device according to claim 3, wherein the first holding capacitor has a capacitance value larger than a capacitance value of the second holding capacitor.

5. The solid-state imaging device according to claim 3, wherein when the first multi-stage sample and hold circuit starts holding the voltage, the first switch element is switched to an OFF state and then the second switch element is changed into an OFF state.

6. The solid-state imaging device according to claim 2, wherein the column constant current source further includes:
a column constant current source transistor connected in series to the load transistor; and
a second multi-stage sample and hold circuit in which sample and hold circuits for sampling and holding the voltage are connected in multiple stages, the second multi-stage sample and hold circuit being connected to the gate terminal of the column constant current source transistor.

7. A solid-state imaging device comprising:
a pixel unit in which a plurality of pixels are arranged in a matrix;
a plurality of vertical common signal lines each of which is provided for a corresponding one of columns of the plurality of pixels, and reads signals of pixels in the corresponding column; and
a column constant current source which supplies a current to the plurality of vertical common signal lines,
wherein the column constant current source includes:
a plurality of load transistors each having a source terminal and a drain terminal one of which is connected to one of the plurality of vertical common signal lines and the other of which is grounded;
a constant voltage supply unit which supplies a voltage to gate terminals of the plurality of load transistors; and
a first multi-stage sample and hold circuit in which sample and hold circuits for sampling and holding the voltage are connected in multiple stages, the first multi-stage sample and hold circuit stabilizing the voltage which is supplied to the gate terminals of the plurality of load transistors, wherein a gate terminal of at least one of the load transistors and the constant voltage supply unit are connected to each other via the first multi-stage sample and hold circuit, the column constant current source further includes:

a column constant current source transistor connected in series to the load transistor; and a second multi-stage sample and hold circuit in which sample and hold circuits for sampling and holding the voltage are connected in multiple stages, the second multi-stage sample and hold circuit being connected to a gate terminal of the column constant current source transistor, the first multi-stage sample and hold circuit includes a first sample and hold circuit and a second sample and hold circuit, the first sample and hold circuit includes:

a first holding capacitor having an electrode connected to a reference potential supply circuit and an other electrode connected to the gate terminal of the load transistor; and a first switch element having a terminal connected to the gate terminal of the load transistor, and the second sample and hold circuit includes:

a second holding capacitor having an electrode connected to the reference potential supply circuit and an other electrode connected to an other terminal of the first switch element;

a second switch element having a terminal connected to the other terminal of the first switch element and an other terminal connected to the constant voltage supply unit, and the second sample and hold circuit includes:

a third sample and hold circuit; and a fourth sample and hold circuit, the third sample and hold circuit includes:

a third holding capacitor having an electrode connected to the reference potential supply circuit and an other electrode connected to a gate terminal of the column constant current source transistor; and a third switch element having a terminal connected to the gate terminal of the column constant current source transistor, and the fourth sample and hold circuit includes:

a fourth holding capacitor having an electrode connected to the reference potential supply circuit and an other electrode connected to an other terminal of the third switch element; and a fourth switch element having a terminal connected to the other terminal of the third switch element.

8. The solid-state imaging device according to claim 7, wherein the first holding capacitor has a capacitance value larger than a capacitance value of the second holding capacitor, and the third holding capacitor has a capacitance value larger than a capacitance value of the fourth holding capacitor.

9. The solid-state imaging device according to claim 1, wherein the first multi-stage sample and hold circuit includes a first sample and hold circuit and a second sample and hold circuit, the first sample and hold circuit includes:

a first holding capacitor having an electrode connected to a reference potential supply circuit and an other electrode connected to the gate terminal of the load transistor; and a first switch element having a terminal connected to the gate terminal of the load transistor, and the second sample and hold circuit includes:

a second holding capacitor having an electrode connected to the reference potential supply circuit and an other electrode connected to an other terminal of the first switch element; and a second switch element having a terminal connected to the other terminal of the first switch element and an other terminal connected to the constant voltage supply unit.

10. The solid-state imaging device according to claim 9, wherein the first holding capacitor has a capacitance value larger than a capacitance value of the second holding capacitor.

11. The solid-state imaging device according to claim 9, wherein when the first multi-stage sample and hold circuit starts holding the voltage, the first switch element is switched to an OFF state and then the second switch element is changed into an OFF state.

12. The solid-state imaging device according to claim 1, wherein the column constant current source further includes:

a column constant current source transistor connected in series to the load transistor; and a second multi-stage sample and hold circuit in which sample and hold circuits for sampling and holding the voltage are connected in multiple stages, the second multi-stage sample and hold circuit being connected to the gate terminal of the column constant current source transistor.

13. The solid-state imaging device according to claim 12, wherein the first multi-stage sample and hold circuit includes a first sample and hold circuit and a second sample and hold circuit, the first sample and hold circuit includes:

a first holding capacitor having an electrode connected to a reference potential supply circuit and an other electrode connected to the gate terminal of the load transistor; and a first switch element having a terminal connected to the gate terminal of the load transistor, and the second sample and hold circuit includes:

a second holding capacitor having an electrode connected to the reference potential supply circuit and an other electrode connected to an other terminal of the first switch element;

a second switch element having a terminal connected to the other terminal of the first switch element and an other terminal connected to the constant voltage supply unit, and the second sample and hold circuit includes:

a third sample and hold circuit; and a fourth sample and hold circuit, the third sample and hold circuit includes:

a third holding capacitor having an electrode connected to the reference potential supply circuit and an other electrode connected to a gate terminal of the column constant current source transistor; and a third switch element having a terminal connected to the gate terminal of the column constant current source transistor, and the fourth sample and hold circuit includes:

a fourth holding capacitor having an electrode connected to the reference potential supply circuit and an other electrode connected to an other terminal of the third switch element; and a fourth switch element having a terminal connected to the other terminal of the third switch element.

14. The solid-state imaging device according to claim 13, wherein the first holding capacitor has a capacitance value larger than a capacitance value of the second holding capacitor, and
the third holding capacitor has a capacitance value larger than a capacitance value of the fourth holding capacitor.

15. An imaging device comprising the solid-state imaging device according to claim 1.

* * * * *